(12) United States Patent
Ghanbarinejad et al.

(10) Patent No.: US 12,471,039 B2
(45) Date of Patent: Nov. 11, 2025

(54) POWER CONTROL USING AT LEAST ONE POWER CONTROL PARAMETER

(71) Applicant: Lenovo (Singapore) PTE. LTD., New Tech Park (SG)

(72) Inventors: Majid Ghanbarinejad, Chicago, IL (US); Hyejung Jung, Northbrook, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 497 days.

(21) Appl. No.: 17/760,261

(22) PCT Filed: Feb. 5, 2021

(86) PCT No.: PCT/IB2021/050967
§ 371 (c)(1),
(2) Date: Aug. 5, 2022

(87) PCT Pub. No.: WO2021/156825
PCT Pub. Date: Aug. 12, 2021

(65) Prior Publication Data
US 2023/0078181 A1    Mar. 16, 2023

Related U.S. Application Data

(60) Provisional application No. 62/971,082, filed on Feb. 6, 2020.

(51) Int. Cl.
*H04W 52/36* (2009.01)
*H04W 16/28* (2009.01)
(Continued)

(52) U.S. Cl.
CPC ......... *H04W 52/367* (2013.01); *H04W 16/28* (2013.01); *H04W 52/143* (2013.01); *H04W 88/04* (2013.01)

(58) Field of Classification Search
CPC . H04W 16/28; H04W 52/143; H04W 52/367; H04W 88/04
See application file for complete search history.

(56) References Cited

U.S. PATENT DOCUMENTS 10,470,136 B1    11/2019  Ghosh et al.
2020/0404593 A1*  12/2020  Yao .................. H04W 52/54
(Continued)

FOREIGN PATENT DOCUMENTS

EP    3046373 A1    7/2016

OTHER PUBLICATIONS

Samsung, "Necessary Enhancements for NR IAB", 3GPP TSG RAN WG1 Meeting #95 R1-1812981, Nov. 12-16, 2018, pp. 1-9.
(Continued)

*Primary Examiner* — Donald L Mills
(74) *Attorney, Agent, or Firm* — Kunzler Bean & Adamson

(57) ABSTRACT

Apparatuses, methods, and systems are disclosed for power control using at least one power control parameter. One method (1600) includes receiving (1602), at a first device, configuration information comprising a power offset value associated with a first plurality of resources and a first reference signal. The method (1600) includes receiving (1604) the first reference signal from a second device. The method (1600) includes performing (1606) a first measurement on the first reference signal. The method (1600) includes calculating (1608) a first expected receive power value based on the first measurement and the power offset value. The method (1600) includes calculating (1610) a first target receive power value. The method (1600) includes transmitting (1612) at least one downlink power control
(Continued)

parameter to the second device based on the first target receive power value and the first expected receive power value.

20 Claims, 17 Drawing Sheets

(51) Int. Cl.
*H04W 52/14* (2009.01)
*H04W 88/04* (2009.01)

(56) References Cited

U.S. PATENT DOCUMENTS

| | | | | |
|---|---|---|---|---|
| 2021/0105726 | A1* | 4/2021 | Yao | H04W 52/10 |
| 2021/0274449 | A1* | 9/2021 | Choi | H04W 88/14 |
| 2021/0298000 | A1* | 9/2021 | Park | H04W 56/001 |
| 2022/0007307 | A1* | 1/2022 | Kim | H04W 52/46 |
| 2022/0123810 | A1* | 4/2022 | Huang | H04L 5/0062 |
| 2022/0330176 | A1* | 10/2022 | Kowalski | H04W 52/325 |
| 2022/0408490 | A1* | 12/2022 | Makki | H04W 52/242 |

OTHER PUBLICATIONS

CMCC, "Discussions on enhancements to support NR Backhaul links", 3GPP TSG RAN WG1 Meeting #94 R1-1808836, Aug. 20-24, 2018, pp. 1-9.

Qualcomm, "New WID on Enhancements to Integrated Access and Backhaul", 3GPP TSG RAN Meeting #86 RP-193251, Dec. 9-12, 2019, pp. 1-5.

PCT/IB2021/050967, Notification of Transmittal of the International Search Report and the Written Opinion of the International Searching Authority, or the Declaration, International Searching Authority, Apr. 23, 2021, pp. 1-15.

3GPP, "3rd Generation Partnership Project; Technical Specification Group Radio Access Network; NR; Physical layer procedures for control (Release 16)", 3GPP TS 38.213 V16.0.0, Dec. 2019, pp. 1-146.

* cited by examiner

POWER CONTROL USING AT LEAST ONE POWER CONTROL PARAMETER

CROSS-REFERENCE TO RELATED APPLICATIONS

This application claims priority to U.S. Patent Application Ser. No. 62/971,082 entitled "APPARATUSES, METHODS, AND SYSTEMS FOR RECEPTION POWER CONTROL IN INTEGRATED ACCESS AND BACKHAUL SYSTEMS" and filed on Feb. 6, 2020 for Majid Ghanbarinejad, which is incorporated herein by reference in its entirety.

FIELD

The subject matter disclosed herein relates generally to wireless communications and more particularly relates to power control using at least one power control parameter.

BACKGROUND

The following abbreviations are herewith defined, at least some of which are referred to within the following description: Third Generation Partnership Project ("3GPP"), 5<sup>th</sup> Generation ("5G"), QoS for NR V2X Communication ("5QI/PQI"), Authentication, Authorization, and Accounting ("AAA"), Positive-Acknowledgment ("ACK"), Aperiodic CSI ("A-CSI"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Component Carrier ("CC"), Clear Channel Assessment ("CCA"), Common Control Channel ("CCCH"), Common Control Channel Service Data Unit ("CCCH SDU"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), CSI-RS Resource Index ("CRI"), Channel State Information ("CSI"), Channel State Information-Reference Signal ("CSI-RS"), Common Search Space ("CSS"), Control Resource Set ("CORESET"), Central Unit ("CU"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Distributed Unit ("DU"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Full-duplex ("FD"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2-24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Hybrid Automatic Repeat Request-Acknowledgement ("HARQ-ACK"), Half-duplex ("HD"), Home Location Register ("HLR"), Handover ("HO"), Home PLMN ("HPLMN"), Home Subscriber Server ("HSS"), Hash Expected Response ("HXRES"), Integrated Access and Backhaul ("IAB"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Master Cell Group ("MCG"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Message A PUSCH Occasion ("MPO"), Maximum Power Reduction ("MPR"), Multi-panel Transmission and Reception ("MPTR"), Message A ("MsgA"), Message B ("MsgB"), Mobile Terminal ("MT"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Non-supplementary Uplink (e.g., a "normal" uplink carrier) ("NUL"), Operation, Administration, and Maintenance System or Operation and Maintenance Center ("OAM"), Orthogonal Frequency Division Multiplexing ("OFDM"), Orthogonal Frequency Division Multiple Access ("OFDMA"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Power Control Resource Set ("PCRS"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Power-offset Resource Set ("PORS"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Power Spectral Density ("PSD"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block ("RB"), Resource Block Assignment ("RBA"), Resource Element ("RE"), Resource Element Group ("REG"), Radio Frequency ("RF"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Scheduling Request Indicator ("SRI"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Spatial-division Multiplexing ("SDM"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Semi-persistent CSI ("SP-CSI"), Single Network Slice Selection Assistance Information ("S-NSSAI"), Scheduling Request ("SR"), Signaling Radio Bearer ("SRB"), SRS Resource Indicator ("SRI"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Synchronization Signal/Physical Broadcast Channel ("SS/PBCH"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Transmission Configuration Indicator ("TCI"), Temporary Cell RNTI ("TC-RNTI"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), UE-specific Search Space ("USS"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, power control may be used.

BRIEF SUMMARY

Methods for power control using at least one power control parameter are disclosed. Apparatuses and systems also perform the functions of the methods. One embodiment of a method includes receiving, at a first device, configuration information comprising a power offset value associated with a first plurality of resources and a first reference signal. In some embodiments, the method includes receiving the first reference signal from a second device. In certain embodiments, the method includes performing a first measurement on the first reference signal. In various embodiments, the method includes calculating a first expected receive power value based on the first measurement and the power offset value. In some embodiments, the method includes calculating a first target receive power value. In certain embodiments, the method includes transmitting at least one downlink power control parameter to the second device based on the first target receive power value and the first expected receive power value.

One apparatus for power control using at least one power control parameter includes a receiver that: receives configuration information comprising a power offset value associated with a first plurality of resources and a first reference signal; and receives the first reference signal from a second device. In various embodiments, the apparatus includes a processor that: performs a first measurement on the first reference signal; calculates a first expected receive power value based on the first measurement and the power offset value; and calculates a first target receive power value. In some embodiments, the apparatus includes a transmitter that transmits at least one downlink power control parameter to the second device based on the first target receive power value and the first expected receive power value.

Another embodiment of a method for power control using at least one power control parameter includes receiving, at a first device, a first reference signal from a second device. In some embodiments, the method includes performing a first measurement on the first reference signal. In certain embodiments, the method includes calculating a first expected receive power value associated with a first plurality of resources based on the first measurement. In various embodiments, the method includes calculating a first target receive power value. In some embodiments, the method includes transmitting at least one downlink power control parameter to the second device based on the first target receive power value and the first expected receive power value.

Another apparatus for power control using at least one power control parameter includes a receiver that receives a first reference signal from a second device. In various embodiments, the apparatus includes a processor that: performs a first measurement on the first reference signal; calculates a first expected receive power value associated with a first plurality of resources based on the first measurement; and calculates a first target receive power value. In certain embodiments, the apparatus includes a transmitter that transmits at least one downlink power control parameter to the second device based on the first target receive power value and the first expected receive power value.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
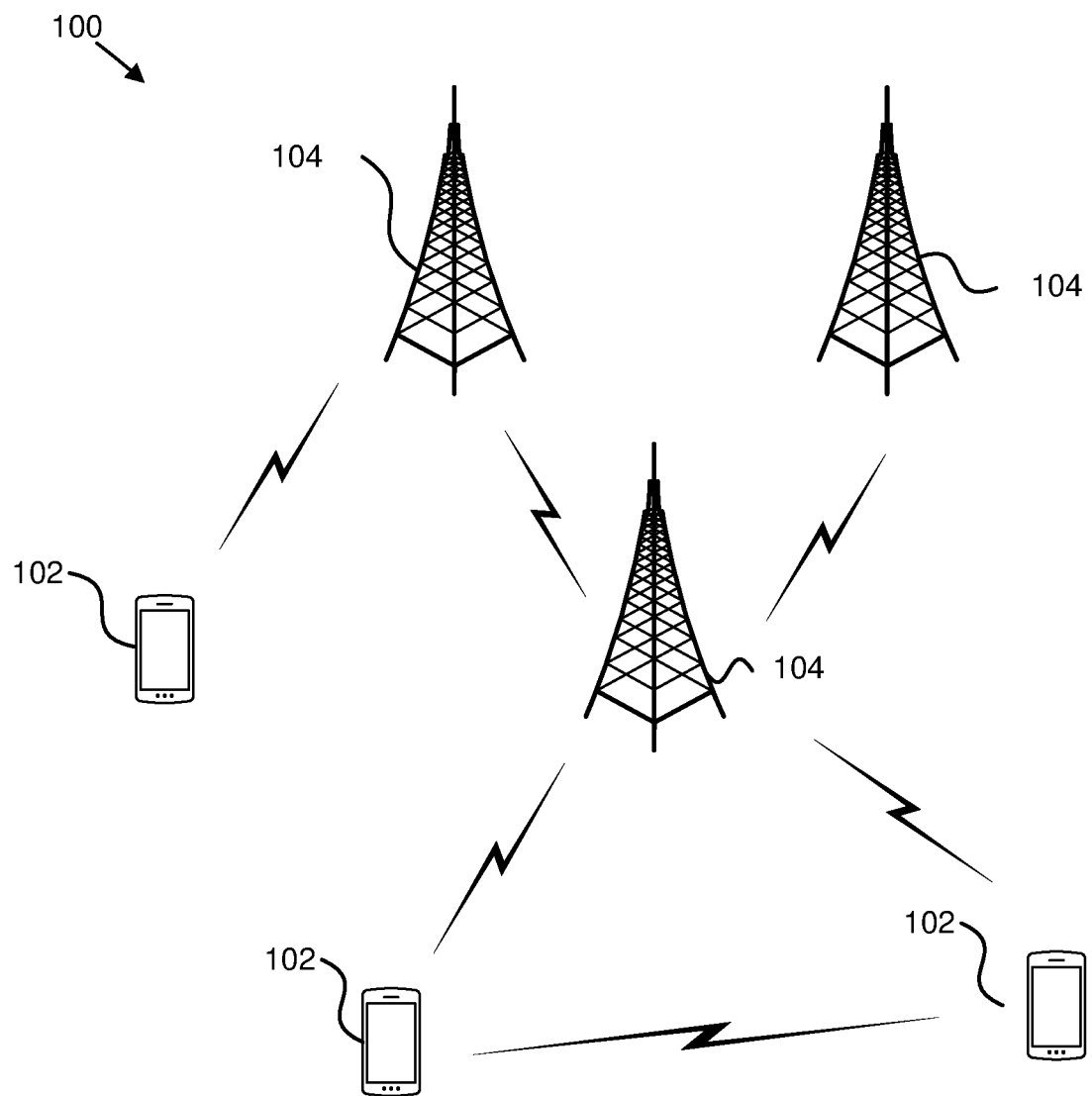
FIG. 1 is a schematic block diagram illustrating one embodiment of a wireless communication system for power control using at least one power control parameter.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this II) specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for power control using at least one power control parameter. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 and/or a network unit 104 may receive, at a first device, configuration information comprising a power offset value associated with a first plurality of resources and a first reference signal. In some embodiments, the remote unit 102 and/or the network unit 104 may receive the first reference signal from a second device. In certain embodiments, the remote unit 102 and/or the network unit 104 may perform a first measurement on the first reference signal. In various embodiments, the remote unit 102 and/or the network unit 104 may calculate a first expected receive power value based on the first measurement and the power offset value. In some embodiments, the remote unit 102 and/or the network unit 104 may calculate a first target receive power value. In certain embodiments, the remote unit 102 and/or the network unit 104 may transmit at least one downlink power control parameter to the second device based on the first target receive power value and the first expected receive power value. Accordingly, the remote unit 102 and/or the network unit 104 may be used for power control using at least one power control parameter.

In various embodiments, a remote unit 102 and/or a network unit 104 may receive, at a first device, a first reference signal from a second device. In some embodiments, the remote unit 102 and/or the network unit 104 may perform a first measurement on the first reference signal. In certain embodiments, the remote unit 102 and/or the network unit 104 may calculate a first expected receive power value associated with a first plurality of resources based on the first measurement. In various embodiments, the remote unit 102 and/or the network unit 104 may calculate a first target receive power value. In some embodiments, the remote unit 102 and/or the network unit 104 may transmit at least one downlink power control parameter to the second device based on the first target receive power value and the first expected receive power value. Accordingly, the remote unit 102 and/or the network unit 104 may be used for power control using at least one power control parameter.

Figure 2:
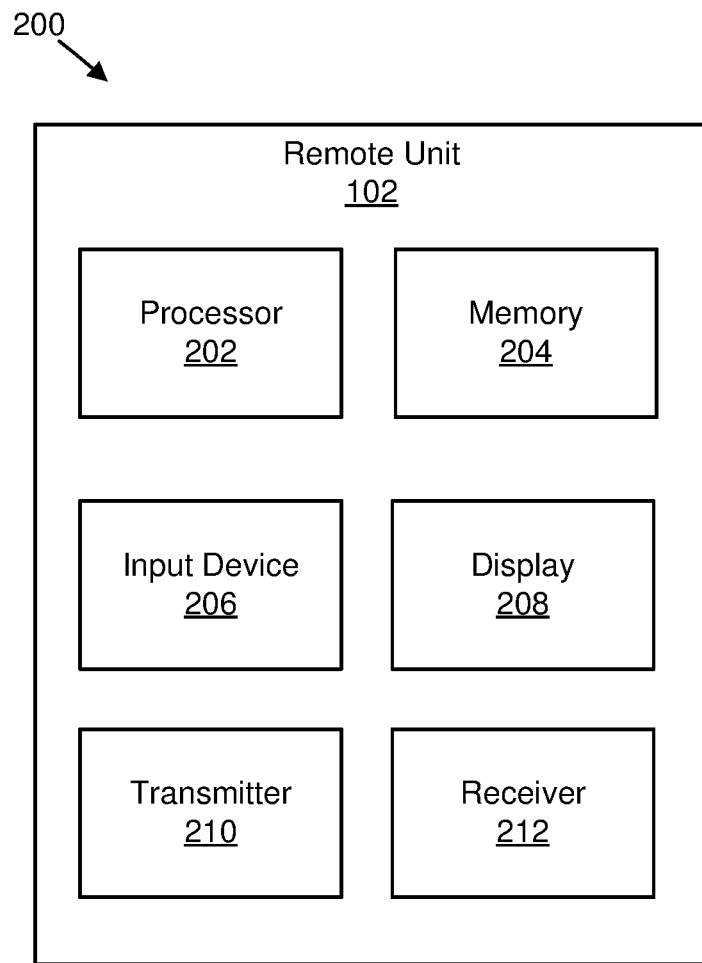
FIG. 2 is a schematic block diagram illustrating one embodiment of an apparatus that may be used for power control using at least one power control parameter.

FIG. 2 depicts one embodiment of an apparatus 200 that may be used for power control using at least one power control parameter. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the receiver 212 may: receive configuration information comprising a power offset value associated with a first plurality of resources and a first reference signal; and receive the first reference signal from a second device. In various embodiments, the processor 202 may: perform a first measurement on the first reference signal; calculate a first expected receive power value based on the first measurement and the power offset value; and calculate a first target receive power value. In some embodiments, the transmitter 210 may transmit at least one downlink power control parameter to the second device based on the first target receive power value and the first expected receive power value.

In various embodiments, the receiver 212 may receive a first reference signal from a second device. In various embodiments, the processor 202 may: perform a first measurement on the first reference signal; calculate a first expected receive power value associated with a first plurality of resources based on the first measurement; and calculate a first target receive power value. In certain embodiments, the transmitter 210 may transmit at least one downlink power control parameter to the second device based on the first target receive power value and the first expected receive power value.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
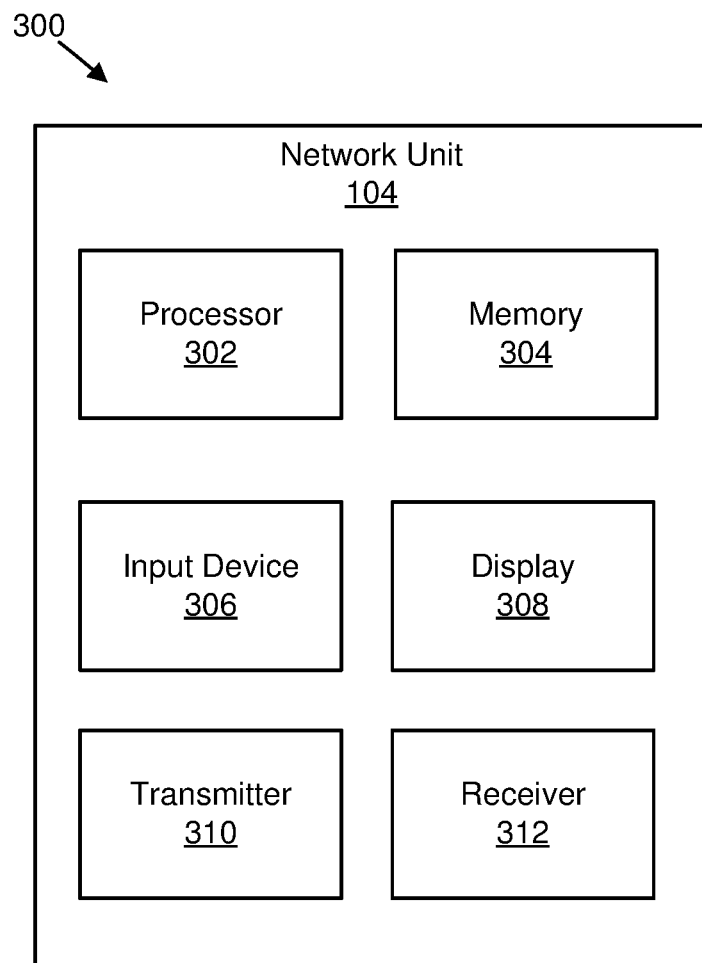
FIG. 3 is a schematic block diagram illustrating one embodiment of an apparatus that may be used for power control using at least one power control parameter.

FIG. 3 depicts one embodiment of an apparatus 300 that may be used for power control using at least one power control parameter. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may: receive configuration information comprising a power offset value associated with a first plurality of resources and a first reference signal; and receive the first reference signal from a second device. In various embodiments, the processor 302 may: perform a first measurement on the first reference signal; calculate a first expected receive power value based on the first measurement and the power offset value; and calculate a first target receive power value. In some embodiments, the transmitter 310 may transmit at least one downlink power control parameter to the second device based on the first target receive power value and the first expected receive power value.

In various embodiments, the receiver 312 may receive a first reference signal from a second device. In various embodiments, the processor 302 may: perform a first measurement on the first reference signal; calculate a first expected receive power value associated with a first plurality of resources based on the first measurement; and calculate a first target receive power value. In certain embodiments, the transmitter 310 may transmit at least one downlink power control parameter to the second device based on the first target receive power value and the first expected receive power value.

In some embodiments, IAB may not be limited to a specific multiplexing and duplexing scheme, but may focus on TDM between uplink communications (e.g., with a parent IAB node and/or donor) and downlink communications (e.g., with a child IAB node or a UE).

In certain embodiments, if uplink and downlink transmissions are not always scheduled in separate time intervals, there may be issues with power control, especially if uplink and downlink communications share a RF and antenna hardware. In various embodiments, an IAB node may be subject to power control in uplink, which may be similar to uplink power control for a UE, but the IAB node may not perform power control in downlink. If the IAB node wants to use the same RF chains and antenna panels for simultaneous uplink and downlink transmissions, the two communications may suffer from an imbalance. A similar problem may exist if the IAB node receives uplink and downlink signals simultaneously. Described herein are various systems and methods for power control enhancements for IAB systems.

In some embodiments, such as for uplink power control in NR, two types of uplink power control may be used: 1) closed-loop power control, which is realized by receiving a signal from a transmitter (e.g., a UE) and sending TPC feedback to the transmitter; and 2) open-loop power control, which is used for initial access. For open-loop power control, the UE receives synchronization signals, from which it may estimate a path-loss, as well as system information, from which it may obtain information on a target receive power. From the path-loss and target receive power, the UE may calculate its transmission power for PRACH transmissions.

In certain embodiments, power control for transmission on a PUSCH may be as follows:

$$P_{PUSCH} = \min\left\{ \begin{array}{l} P_{CMAX}, \\ P_0(j) + \alpha(j) \cdot PL(q) + 10 \cdot \log_{10}(2^\mu \cdot M_{RB}) + \Delta_{TF} + \delta(l) \end{array} \right\} \quad (1)$$

Where the variables are defined in Table 1:

TABLE 1

| | |
|---|---|
| $P_{PUSCH}$ | PUSCH transmission power |
| $P_{CMAX}$ | Maximum transmission power per carrier |
| $P_0(j)$ | Normalized target received power; network-configurable |
| $PL(q)$ | Uplink path-loss estimate |
| $\alpha(j)$ | Fractional path-loss compensation parameter; network-configurable |
| $\mu$ | Numerology (subcarrier spacing) parameter |
| $M_{RB}$ | Number of resource blocks assigned for PUSCH transmission |
| $\Delta_{TF}$ | Parameter related to modulation and coding scheme (MCS) |
| $\delta(l)$ | Power adjustment due to closed-loop power control |

Moreover, the following are further defined: 1) $P_0 + \alpha \cdot PL$: basic open-loop power control with fractional path-loss compensation; 2) $\Delta_{TF} = 10 \log((2^{1.25\gamma} - 1) \cdot \beta)$, where $\gamma$ is the number of information bits in the PUSCH normalized by the number of REs used for transmission (excluding DM-RS REs, etc.), and $\beta = 1$ for PUSCH containing data, but can be set to other values for layer-1 PUSCH containing control (UCI). Indeed, $\Delta_{TF}$ sets the transmission power to 80% of Shannon capacity. The value of $\Delta_{TF}$ is nonzero only for single-layer transmission. It can be disabled. For example, when fractional path-loss compensation is used, it should be disabled; 3) the beam indices q, j, l correspond to different values of SRI and enable beam-based power control: q allows different values of path-loss corresponding to different beams, j allows different values of open-loop power control parameter pair ($P_0$, $\alpha$) as seen tin Table 2, and l allows two values for the closed-loop process.

TABLE 2

| | |
|---|---|
| j = 0 | Used for random access Msg-3; always $\alpha = 1$ |
| j = 1 | Grant-free PUSCH |
| j > 1 | Scheduled PUSCH |

For transmission on a PUCCH, $\alpha$ is always equal to 1 (e.g., path-loss compensation for PUCCH is never fractional).

In various embodiments, a MT that is part of an IAB node has a similar behavior to a UE and, therefore, may be subject to similar power control procedures for uplink communications with a DU of its serving cell.

Figure 4:
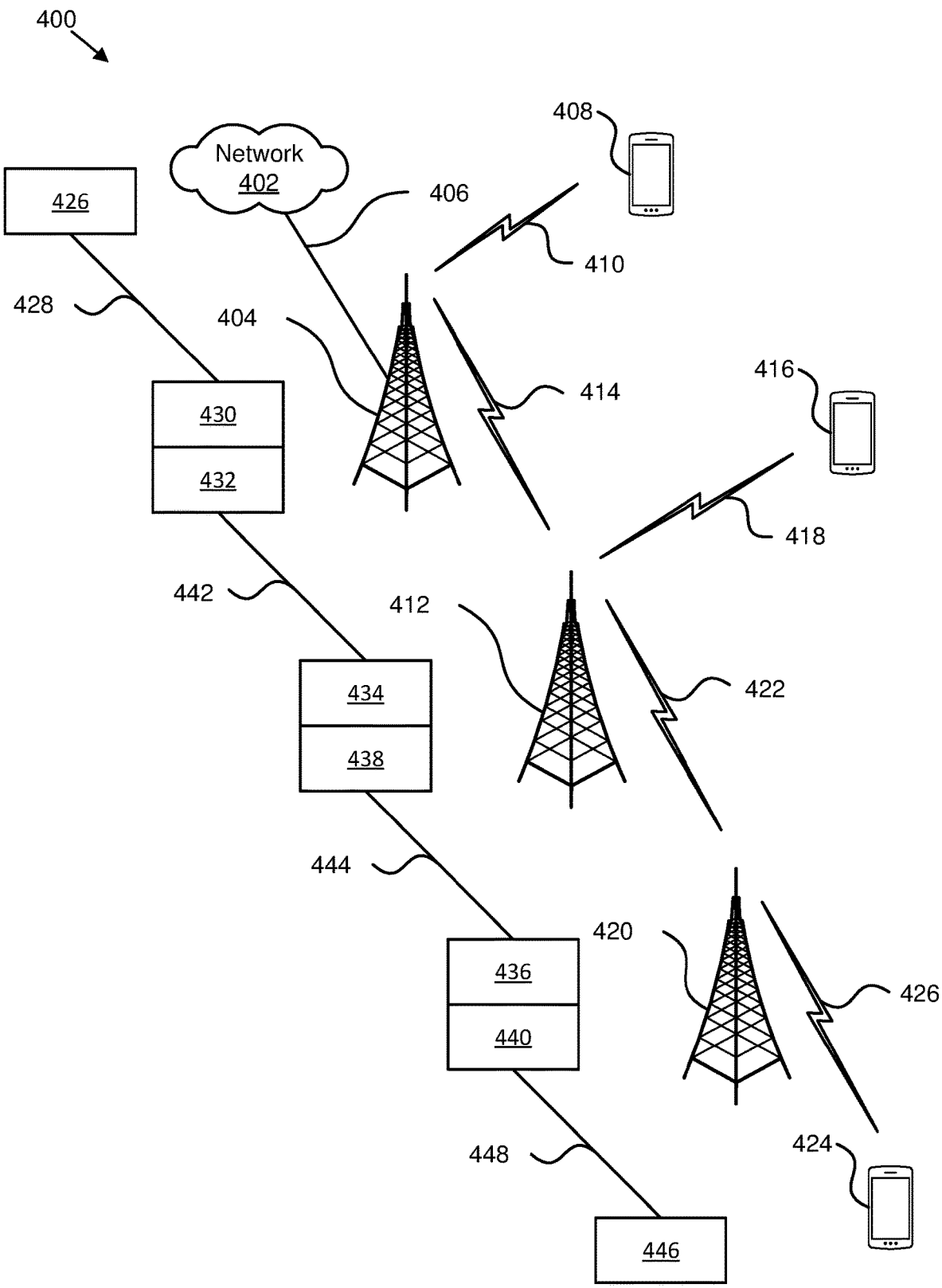
FIG. 4 is a diagram illustrating one embodiment of an IAB system.

FIG. 4 is a diagram illustrating one embodiment of an IAB system 400. The IAB system 400 includes a network 402 (e.g., core network) that communicates with an IAB donor 404 via a first communication link 406. Moreover, the IAB system 400 also includes a first UE 408 that communicates with the IAB donor 404 via a second communication link 410. Further, the IAB system 400 includes a first IAB node 412 that communicates with the IAB donor 404 via a third communication link 414. The IAB system 400 also includes a second UE 416 that communicates with the first IAB node 412 via a fourth communication link 418. Moreover, the IAB system 400 includes a second IAB node 420 that communicates with the first IAB node 412 via a fifth communication link 422. Further, the IAB system 400 includes a third UE 424 that communicates with the second IAB node 420 via a sixth communication link 426.

As illustrated in further detail, a network 426 is connected to the IAB donor 404 through a backhaul link 428, which may be wired. The IAB donor 404 includes a CU 430 and a DU 432. The IAB donor 404 communicates with all the DUs in the system through an F1 interface. Each IAB node (e.g., 412 and 420) is functionally split into at least an MT (e.g., 434, 436) and a DU (e.g., 438, 440). An MT of an IAB node is connected to a DU of a parent node, which may be another IAB node or the IAB donor 404.

A connection (e.g., 414, 422, 426, 442, 444) between an MT of an IAB node and a DU of a parent node is called a wireless backhaul link. In the wireless backhaul link, in terms of functionalities, the MT is similar to a UE and the DU of the parent node is similar to a base station in a conventional cellular wireless link. Therefore, a link from an MT to a serving cell that is a DU of a parent link is called an uplink, and a link in the reverse direction is called a downlink. In this disclosure, embodiments may simply refer to an uplink or a downlink between IAB nodes, a link between a node and its parent, a link between a node and its child, and so forth without a direct reference to an MT, DU, serving cell, and so forth.

Each IAB donor or IAB node may serve UEs (e.g., 446) through access links (e.g., 448). IAB systems like IAB system 400 may be designed to enable multi-hop communications (e.g., a UE may be connected to the core network through an access link and multiple backhaul links between IAB nodes and an IAB donor). As used herein, unless stated otherwise, an "IAB node" may generally refer to an IAB node or an IAB donor as long as a connection between a CU and a core network is not concerned.

A node, link, etc. closer to an IAB donor and/or core network may be called an upstream node, link, etc. For example, a parent node of a subject node is an upstream node of the subject node and the link to the parent node is an upstream link with respect to the subject node. Similarly, a node, link, etc. farther from the IAB donor and/or core network is called a downstream node, link, etc. For example, a child node of a subject node is a downstream node of the subject node and the link to the child node is a downstream link with respect to the subject node.

Table 3 summarizes the terminology used herein.

TABLE 3

| Phrase | Description |
| --- | --- |
| Wireless backhaul link | A connection between an MT of an IAB node and a DU of a serving cell |
| Wireless access link | A connection between a UE and (a DU of) a serving cell |
| Parent [IAB] node | An IAB node or IAB donor that includes a serving cell of the subject node |
| Child [IAB] node | An IAB node that identifies the subject node as a serving cell |
| Sibling [IAB] node | An IAB node that has a common parent with the subject node |
| Uplink (of a wireless backhaul link) | A link from an MT to a DU of a parent node |
| Downlink (of a wireless backhaul link) | A link from a DU to an MT of a child node |
| Upstream node, link, etc. | A node, link, etc. (topologically) closer to the IAB donor and/or core network |
| Downstream node, link, etc. | A node, link, etc. (topologically) farther from the IAB donor and/or core network |

Described herein are various systems and methods for power control in IAB systems to facilitate higher performance in terms of resource efficiency, multi-hop latency, complexity, and so forth.

In some embodiments, an IAB network may be connected to a core network through one or multiple IAB donors. Each IAB node may be connected to an IAB donor and/or other IAB nodes through wireless backhaul links. Each IAB donor and/or node may also serve UEs.

Figure 5:
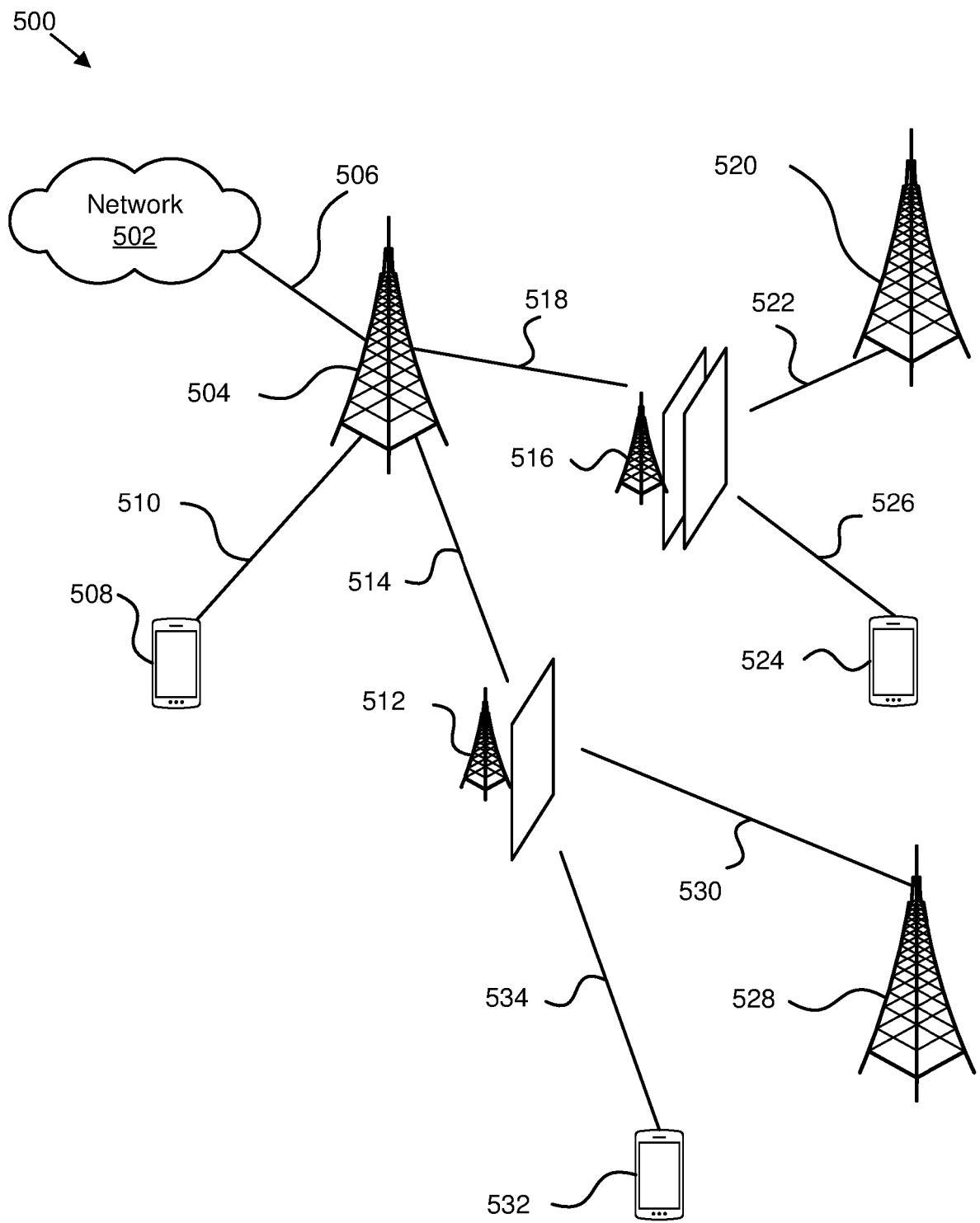
FIG. 5 is a diagram illustrating another embodiment of an IAB system.

FIG. 5 is a diagram illustrating another embodiment of an IAB system 500. The IAB system 500 includes an IAB network 502 and an IAB donor 504 (e.g., parent IAB node) connected by a first backhaul link 506. The IAB system 500 includes a first UE 508 connected to the IAB donor 504 by a second backhaul link 510. Moreover, the IAB system 500 includes a first IAB node 512 (e.g., single-panel node) connected to the IAB donor 504 by a third backhaul link 514. Furthermore, the IAB system 500 includes a second IAB node 516 (e.g., multi-panel node) connected to the IAB donor 504 by a fourth backhaul link 518. The IAB system 500 includes a third IAB node 520 (e.g., child IAB node) connected to the second IAB node 516 by a fifth backhaul link 522. Moreover, the IAB system 500 includes a second UE 524 connected to the second IAB node 516 by a sixth backhaul link 526. Furthermore, the IAB system 500 includes a fourth IAB node 528 (e.g., child IAB node) connected to the first IAB node 512 by a seventh backhaul link 530. The IAB system 500 includes a third UE 532 connected to the first IAB node 512 by an eighth backhaul link 534.

In certain embodiments, there may be various options with regards to a structure, multiplexing capabilities, and/or duplexing capabilities of an IAB node. For example, each IAB node may have one or more antenna panels, each connected to the baseband unit through an RF chain. The one or more antenna panels may be able to serve a whole spatial area of interest in a vicinity of the IAB node, or each antenna panel or each group of antenna panels may provide a partial coverage, such as in a sector. An IAB node with multiple antenna panels, each serving a separate spatial area or sector, may be referred to as a single-panel IAB node as it behaves similarly to a single-panel IAB node for communications in each of the separate spatial areas or sectors.

In some embodiments, antenna panels of an IAB node having multiple antenna panels may be HD, meaning that the antenna panels are able to either transmit signals or receive signals in a frequency band at a certain time, or antenna panels of the IAB node may be FD, meaning that the antenna panels are able to both transmit signals and receive signals in a frequency band simultaneously. Unlike FD radio, HD radio may be widely implemented and used in practice and may be assumed as a default mode of operation in wireless systems.

Table 4 lists different duplexing scenarios that may be used if multiplexing is not constrained to TDM. In Table 4, IAB node 1 (N1) is a single-panel IAB node; IAB node 2 (N2) is a multi-panel IAB node; SDM refers to either transmission or reception on downlink (or downstream) and uplink (or upstream) simultaneously; FD refers to simultaneous transmission and reception by a same antenna panel in a frequency band; and MPTR refers to simultaneous transmission and reception by multiple antenna panels where each antenna panel either transmits or receives in a frequency band at a time.

TABLE 4

| Scenario | IAB-MT | IAB-DU | Type |
| --- | --- | --- | --- |
| S1 | N1-DL-RX | N1-UL-RX | SDM |
| S2 | N1-DL-RX | N1-DL-TX | FD |
| S3 | N1-UL-TX | N1-DL-TX | SDM |
| S4 | N1-UL-TX | N1-UL-RX | FD |
| S5 | N2-DL-RX | N2-UL-RX | SDM |
| S6 | N2-DL-RX | N2-DL-TX | MPTR and/or FD |
| S7 | N2-UL-TX | N2-DL-TX | SDM |
| S8 | N2-UL-TX | N2-UL-RX | MPTR and/or FD |

For example, consider scenario S1 in which a single-panel IAB node N1 receives downlink and uplink signals. Downlink signals may come on a backhaul link from an IAB donor or a parent IAB node. Uplink signals may be received on an access link from a UE1 or on a backhaul link from a child IAB node 1 (CN1) or both. Uplink signals may be power-controlled enabling multiple UEs and/or child nodes to transmit signals to the node simultaneously. Downlink signals, however, may not be power-controlled, which may result in a significant imbalance between the received powers at the subject node. This power imbalance may cause an interference on weaker signals to the point that they cannot be decoded. In various embodiments, downlink power control may be provided.

Figure 6:
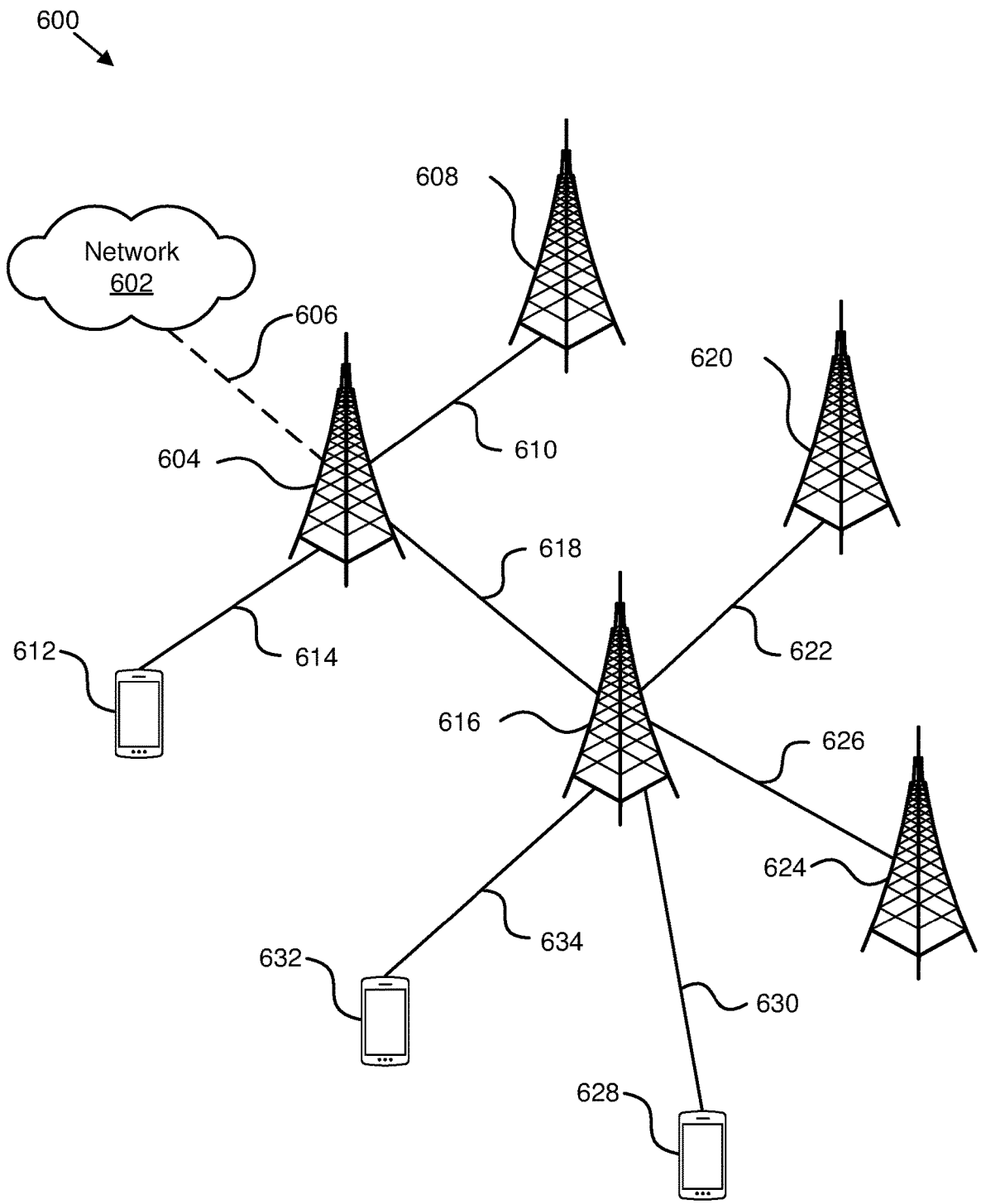
FIG. 6 is a diagram illustrating a further embodiment of an IAB system.

FIG. 6 is a diagram illustrating a further embodiment of an IAB system 600. The IAB system 600 includes an IAB network 602 and a parent node 604 connected by a first backhaul link 606. Moreover, the IAB system 600 includes a sibling node 608 connected to the parent node 604 by a second backhaul link 610. The IAB system 600 includes a first UE 612 connected to the parent node 604 by a third backhaul link 614. Furthermore, the IAB system 600 includes an IAB node 616 connected to the parent node 604 by a fourth backhaul link 618. The IAB system 600 includes a first child node 620 connected to the IAB node 616 by a fifth backhaul link 622. Moreover, the IAB system 600 includes a second child node 624 connected to the IAB node 616 by a sixth backhaul link 626. Furthermore, the IAB system 600 includes a second UE 628 connected to the IAB node 616 by a seventh backhaul link 630. The IAB system 600 includes a third UE 632 connected to the IAB node 616 by an eighth backhaul link 634.

In FIG. 6, the IAB node 616 (N) is connected to a core network through the parent node 604 (PN), which may be another IAB node or an IAB donor. The parent node 604 may serve other nodes, which may be called sibling nodes (SN) of N (e.g., sibling node 608). The IAB node 616 may serve child nodes such as the first child node 620 (CN1) and the second child node 624 (CN2) and user equipment such as the third UE 632 (UE1) and the second UE 628 (UE2). Each of the parent nodes, sibling nodes, and child nodes may serve other nodes or user equipment such as the first UE 612 (UE0).

In some embodiments, a parent IAB node of a subject IAB node may adjust a transmission power for communications on a resource set and inform the subject IAB node of the power adjustment through control signaling.

In certain embodiments, a parent IAB node configures a resource set, typically in time and frequency domains, in an aperiodic, semi-persistent, or periodic manner. The configuration may be sent through RRC signaling, but may be conveyed through MAC or physical layer signaling such as DCI. For example, a semi-persistent configuration may be activated and/or deactivated by MAC signaling, or an aperiodic configuration may be indicated by a DCI message.

In various embodiments, information (e.g., including one or more configuration messages, which is referred to herein as a power-offset resource set (PORS) configuration) conveyed through a configuration and/or other control signaling may include: 1) an ID for the configuration; 2) a resource set: a) resources in time: slots, symbols, periodicity of occurrence, and so forth, b) resources in frequency: PRB, BWP, CC, and so forth; 3) power offset (e.g., in dB with respect to a reference power such as ss-PBCH-BlockPower, referenceSignalPower (which is offset from ss-PBCH-BlockPower by powerControlOffsetSS), and so forth)—in one example, the power offset may be a set of possible power offset values or a range of power offset values (e.g., min power offset, max power offset); 4) beam-based information (e.g., spatial QCL with respect to a reference signal); and/or 5) received target power from parent node—the target reception power at the IAB node (e.g., PSD in dBm per RE or RB, can be considered similar to Po, this may be for a reference channel such as PDSCH and/or PDCCH or a reference signal such as demodulation RS, or CSI-RS, the IAB node may be expected to receive a channel and/or signal from the parent node within +/−X dB from the received target power level).

In one embodiment, an IAB node may request a value of received target power for channel and/or signal reception from a parent node on a resource set or generally for any resource assigned. In such an embodiment, the IAB node may determine a target reception power based on measurements (e.g., RSRP) from the parent node and/or the target received power settings for reception from a child node or UEs the IAB is serving. The IAB node may transmit a requested received target power (e.g., using higher layer signaling such as a MAC control element) on a PUSCH or PUCCH on an MT uplink. The IAB-node may determine uplink power control parameters for a child node or a UE based on the received target power from parent node.

After an IAB node receives a PORS configuration from a parent IAB node, the IAB node may schedule uplink transmissions for its own child IAB nodes and UEs based on their respective expected receive power (RXP_exp).

Figure 7:
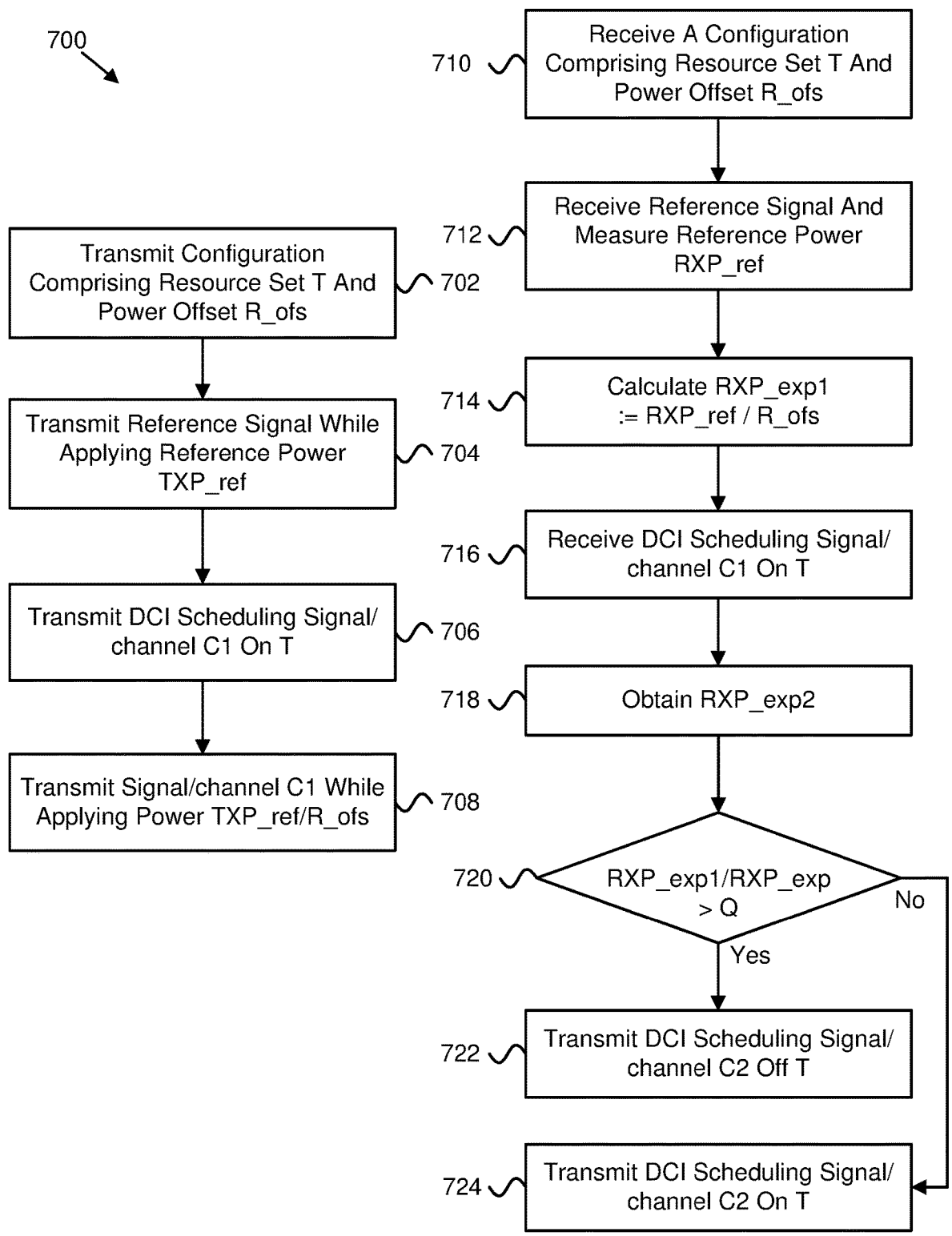
FIG. 7 is a flow chart diagram illustrating one embodiment of a method including transmission and/or reception of a PORS configuration.

FIG. 7 is a flow chart diagram illustrating one embodiment of a method 700 including transmission and/or reception of a PORS configuration.

The method 700 includes elements 702-708 that are performed by a parent (e.g., upstream) node and elements 710-724 that are performed by a subject (e.g., downstream) node.

In the elements 702-708 performed by the parent node, the parent node (PN) transmits 702 a PORS configuration including at least a set of time-frequency resources T and a power offset R_ofs. The PORS configuration may include an index and/or reference to a reference signal such as a SS/PBCH block or a CSI-RS.

The PN transmits 704 a reference signal while applying a reference power (TXP_ref). The reference signal is associated with the PORS configuration (e.g., the relative power offset with respect to the reference signal power) either implicitly or explicitly through a higher layer parameter. This reference signal may be an SS/PBCH block or a CSI-RS. The reference signal may be transmitted in a periodic manner (e.g., transmissions may occur before or after the element 702).

Next, the PN transmits 706 a DCI scheduling a signal and/or channel (C1) such as a PDSCH on resources in the resource set T.

Finally, the PN transmits 708 the signal and/or channel C1 while applying a transmit power TXP_ref and/or R_ofs.

In the elements 710-724 performed by the subject node, the subject node (N) receives 710 a PORS configuration including at least a set of time-frequency resources T and a power offset R_ofs. The PORS configuration may include an index and/or reference to a reference signal such as an SS/PBCH block or a CSI-RS.

The N receives 712 a reference signal and measures a reference power (RXP_ref), which is normally equal to a transmit reference power (TXP_ref) attenuated by a communication channel. The reference signal is associated with the PORS configuration (e.g., the relative power offset with respect to the reference signal power) either implicitly or explicitly through a higher layer parameter. This reference signal may be an SS/PBCH block or a CSI-RS. The reference signal may be transmitted in a periodic manner (e.g., receptions may occur before or after element 710).

The N calculates 714 a first expected receive power RXP_exp1:=RXP_ref/R_ofs associated with the resource set T.

Next, the N receives 716 a DCI scheduling a signal and/or channel (C1) such as a PDSCH on resources in the resource set T.

The N also obtains 718 a second expected receive power RXP_exp2 associated with a signal and/or channel (C2) from another node, such as a child node (CN) or a UE. The N may obtain RXP_exp2 by performing a measurement on a communication from a CN and/or UE such as on a SRS.

Then, the N compares 720 the two expected receive powers RXP_exp1 and RXP_exp2.

If the ratio between the two values exceeds a threshold Q, the N may need to transmit 722 DCI to schedule the signal and/or channel C2 from the CN and/or UE on resources that do not overlap with the resource set T. In particular, the N may need to schedule C2 on separate time resources, which results in a TDM method. The threshold may depend on a capability of N to handle power imbalance.

Otherwise, if the ratio does not exceed the threshold Q, the N may transmit 724 DCI to schedule C2 from CN and/or UE on resources that do overlap with the resource set. In particular, the N may schedule C2 on overlapping time resources, which results in a FDM or SDM method.

Figure 8:
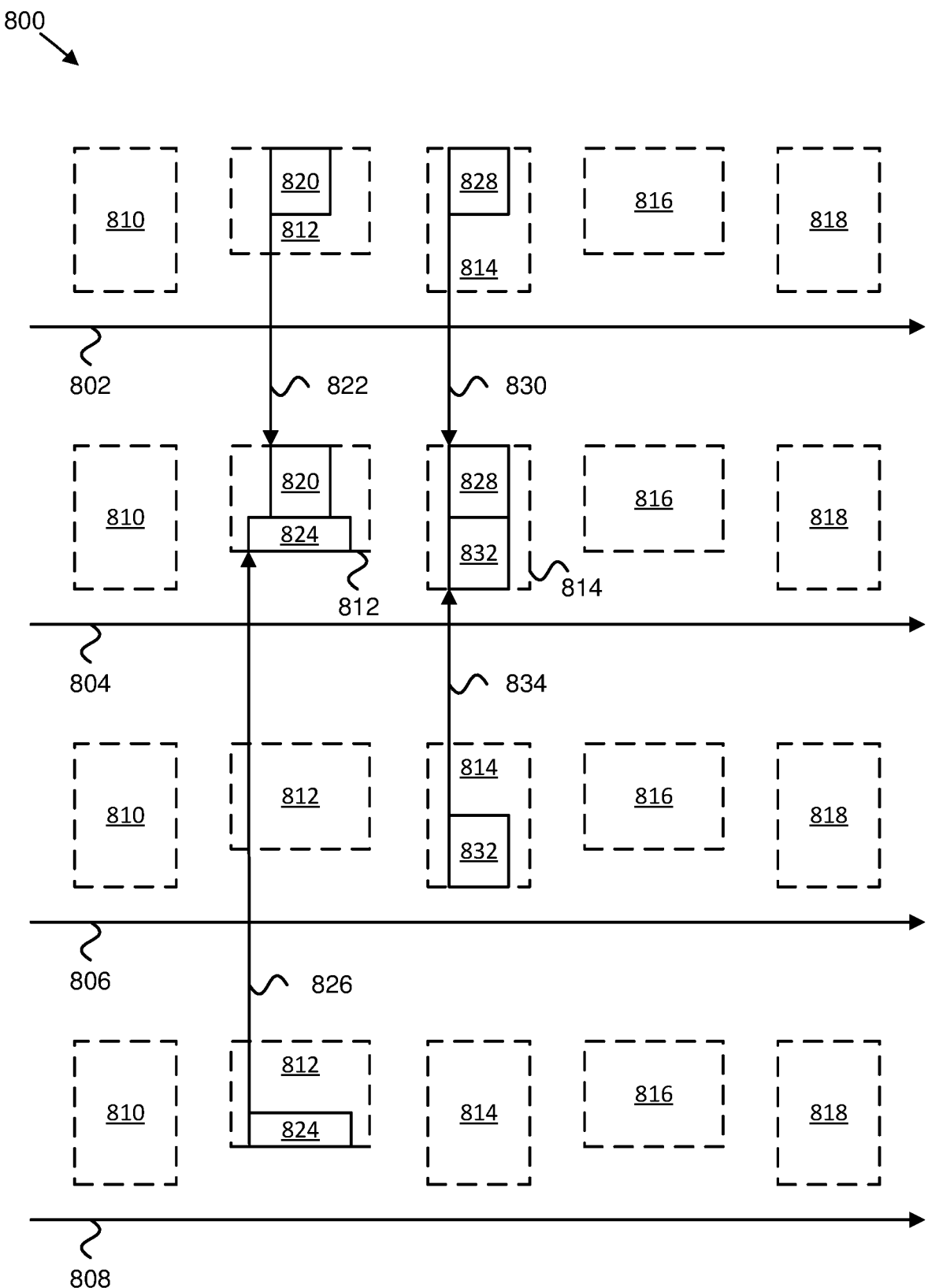
FIG. 8 is a timing diagram illustrating timing corresponding to transmission and/or reception of a PORS configuration.

FIG. 8 is a timing diagram 800 illustrating timing corresponding to transmission and/or reception of a PORS configuration. The timing diagram 800 illustrates timing 802 corresponding to a PN, timing 804 corresponding to an N, timing 806 corresponding to a first child node (CN1), and timing 808 corresponding to a second child node (CN2). A first PORS (PORS 1) configures transmission opportunities 810, 814, and 818, while a second PORS (PORS 2) configures transmission opportunities 812 and 816. In the transmission opportunity 812, the PN transmits a PDSCH transmission 820 to the N as shown by directional transmission 822, and the CN2 transmits a PUSCH transmission 824 to the N as shown by directional transmission 826. In the transmission opportunity 814, the PN transmits a PDSCH transmission 828 to the N as shown by directional transmission 830, and the CN1 transmits a PUSCH transmission 832 to the N as shown by directional transmission 834.

In certain embodiments, PORS 1 and PORS 2 are configured in a periodic or semi-persistent manner.

In various embodiments, PORS 1 provides a power offset transmitted from PN that results in receive power RXP1 in N. Similarly, in such embodiments, PORS 2 provides a power offset transmitted from PN that results in receive power RXP2 in N.

N expects a receive power RXP_exp1 from its child IAB node CN1. The difference between RXP1 and RXP_exp1 may be smaller than the power imbalance threshold that can be tolerated by N. Similarly, N expects a receive power RXP_exp2 from its child IAB node CN2. The difference between RXP2 and RXP_exp2 may be smaller than the power imbalance threshold that can be tolerated by N.

PN schedules PDSCH transmissions to N, which use resources from PORS 1 and PORS 2. Having obtained information of power offset that is applied to resources in PORS 1 and PORS 2, N can schedule PUSCH transmissions for CN1 and CN2 in the resources associated with (or multiplexed with) PORS 1 and PORS 2, respectively.

In some embodiments, the PN may need to know which PORS configurations are relevant. If PN does not have specific knowledge and configures generic PORS, resources may be wasted because the power offset does not match the expected power from any of the CNs or UEs.

In various embodiments, N may send power offset requests or received target power requests similarly to DL-PC requests. However, in such embodiments, the request may not be for a particular transmission and may not need to be accommodated immediately. Instead, having obtained power offset requests or received target power requests from N and possibly its sibling IAB nodes (SNs), PN may configure new PORS or modify existing PORS to accommodate each of the IAB nodes' needs for enhanced duplexing.

In certain embodiments, N may send control signaling to PN to inform PN about which PORS configurations are suitable for N. In a mobile IAB system, this information may change frequently and such updates may be sent regularly.

In some embodiments, a decision by a subject node N may be about whether to schedule a downstream communication with a child node or UE simultaneously with an upstream communication with a parent node.

In various embodiments, based on DL RS measurements of a serving cell (e.g., PN), an IAB-node N may set uplink power control parameters for a child node or a UE. The uplink power control parameters may include open-loop parameters and/or closed-loop parameters (e.g., P0, α, step size for TPC commands).

Figure 9:
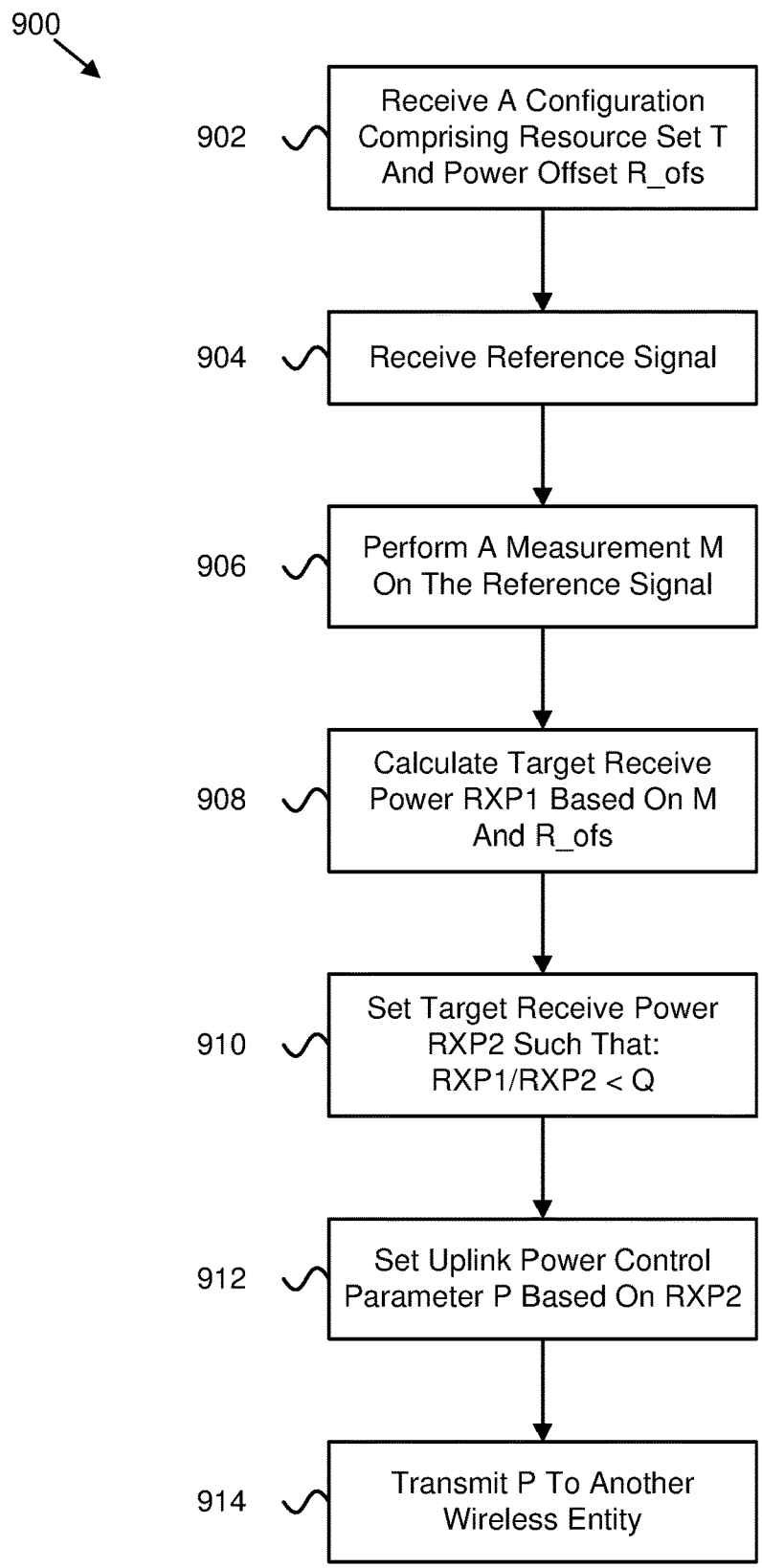
FIG. 9 is a flow chart diagram illustrating one embodiment of power control.

FIG. 9 is a flow chart diagram 900 illustrating one embodiment of power control.

In FIG. 9, an IAB node N receives 902 a PORS configuration including a resource set T and an associated power offset R_ofs. This configuration may be transmitted by a parent node (PN). Then, the N receives 904 a reference signal such as an SS/PBCH block or a CSI-RS and performs 906 a measurement M on the reference signal. Having obtained results of the measurement M such as an SSB-RSRP or CSI-RSRP, the N calculates 908 a target receive power RXP1 based on M and R_ofs. The calculated result may be an expected receive power on a communication on the resource set T.

Next, the N sets 910 a second target receive power RXP2 for another communication from a child node (CN) or a UE. There may be a constraint that the ratio between RXP1 and RXP2, or the difference between RXP1 and RXP2 when described in decibels, must not exceed a threshold Q. This threshold may be set by the standard, configured by the network (e.g., semi-statically or dynamically indicated), or dependent on a capability of N. The target receive powers may be described in energy per resource element (EPRE), where a resource element (RE) is a resource unit in the time-frequency resource grid.

Finally, the N sets 912 uplink control parameters to the CN and/or UE. The uplink control parameters may include one or more sets of closed-loop and/or open-loop power control parameters such as $P_0$, α, and so forth. The CN and/or UE will then use those parameters for communication with N. Specifically, the N may set uplink power control parameter P based on RXP2, then the N may transmit 914 P to another wireless entity.

In various embodiments, uplink control parameters used by a CN and/or a UE may be associated with a resource set in the downstream that overlaps a resource set T in the upstream. In some embodiments, configurations of similar resource sets may be configured for both upstream and downstream links that include identical or similar resource sets, but difference power control parameters such as: 1) the upstream configuration is a PORS configuration containing power offset information; and/or 2) the downstream configuration contains uplink power control information.

In certain embodiments, although two configurations may be of different types, they may have similar relationship between parameters. For example, if a PORS configuration on resource set T1 indicates a power offset R1 with respect to a reference signal, and another PORS configuration on resource set T2 indicates a power offset R2 with respect to the same reference signal, then the associated uplink power control parameters (e.g., power spectral density offset) P1 and P2 for the downstream communications may follow a similar ratio, such as: 1) in real scale: P1/P2=R1/R2; or 2) in dB scale: P1−P2=R1−R2, for example.

In some embodiments, relationships between parameters may be maintained by implementation because the configurations are transmitted and received by different entities, but in other embodiments relationships may be configured in a standard specification.

In one embodiment, an IAB node (N) may perform power control when receiving signals. This may happen when there is a significant imbalance between the power of a signal received from a downstream node {CN1, CN2, UE1, UE2} and a signal received from an upstream node PN. The IAB node N may be able to fully or partially address the issue by performing uplink power control with {CN1, CN2, UE1, UE2}. However, if uplink power control alone does not address the problem, N may send a power control request to PN to change its transmission power.

In various embodiments, the N cannot tolerate a power imbalance higher than a threshold Q. For example, the N may maintain $P_{DL}/P_{UL} \leq Q$ (and also $P_{UL}/P_{DL} \leq Q$) to decode received signals, where $P_{DL}$ denotes a received power of the downlink signal received from PN, and $P_{UL}$ denotes a received power of the uplink signal received from {CN1, CN2, UE1, UE2}. The received power may be a normalized value such as received power per RB or RE. The threshold Q may be applicable to signals that are less than a value Δf apart in the frequency domain. Then, if $P_{DL}/P_{UL}>Q$, the IAB node N may perform power control to increase uplink power and/or decrease downlink power.

In certain embodiments, an IAB node N may be able to apply power control on an uplink signal to some extent. However, increasing transmission power by {CN1, CN2, UE1, UE2} may be limited by a node capability, radiation regulations, interference management considerations, and so forth. For example, the N may be able to increase an uplink signal by a ratio $R_{UL}$ while a ratio R is needed, and $R_{UL}<R$. Then, the N may have the following options: 1) option 1: perform scheduling in a way that avoids FDM between signals from PN and {CN1, CN2, UE1, UE2} in a frequency gap Δf; and 2) option 2: perform downlink power control to decrease the signal power from PN by at least $R_{DL}=R/R_{UL}$.

As may be appreciated, option 1 may be too constraining given that IAB systems aim at efficient bandwidth utilization in ultra-dense deployments. Therefore, the N may send a power control request to PN to decrease the downlink power.

In various embodiments, a downlink power control (DL-PC) request may contain some or all the following information: 1) an identification number (ID); 2) a desired value of power change, for example, by a ratio $R_{DL}$—the value may normally be described in decibels (dB)—in some embodiments, maximum and minimum values for a power change may be included; 3) a reference power if the transmission power is different for different downlink signals—for example, if PN applies power P1 for signal and/or channel C1 and power P2 for transmitting signal and/or channel C2, then the DL-PC request may contain a reference to either C1 or C2—examples of C1 and C2 are a PDCCH, a PDSCH, a SS/PBCH block, a CSI-RS, and so forth; 4) time information for applying the power change—for example, the DL-PC request may contain a request to change a transmission power for a certain signal and/or channel, for a certain time interval, for the transmissions that follow until a next DL-PC signaling, and so forth; 5) frequency information, such as a sub-band of interest (e.g., a start PRB and a number of PRBs); and/or 6) spatial information, for example, information of a specific beam—the DL-PC request may make a reference to a beam by a beam index such as a CRI, or a QCL reference to a signal and/or channel such as a PDCCH, PDSCH, SSB/PBCH block, and so forth.

In some embodiments, a PN serves multiple nodes simultaneously, and it may communicate with a parent node of its own as well. Therefore, a DL-PC request may or may not be accommodated. Therefore, PN may send a DL-PC response to the N informing it of whether and how the DL-PC request may be accommodated. A DL-PC response may contain one or more of the following information: 1) an identification number (ID), possibly with a reference to a DL-PC request ID; 2) whether or not the DL-PC request is granted; 3) a granted value of power change, for example a ratio $R_{DL}$—the value may be described in decibels (dB) and may be equal or close to a desired value contained in the DL-PC request—in one embodiment, a value between a minimum requested value and a maximum requested value may be selected; 4) time information for applying the power change—for example, the DL-PC response may contain a reference to a certain signal and/or channel, to a certain time interval, to the transmissions that follow until a next DL-PC signaling, and so forth; 5) frequency information such as a sub-band (e.g., a start PRB and a number of PRBs); and/or 6) spatial information, for example, information of a specific beam. The DL-PC response may make a reference to a beam by a beam index such as a CRI, or by a QCL reference to a signal and/or channel such as a PDCCH, PDSCH, SSB/PBCH block, and so forth.

In certain embodiments, an IAB node N may schedule uplink signals based on information in a DL-PC response (or lack thereof). For example, the N may allow FDM between downlink signals and only uplink signals that may be received by a sufficient power, for example, by a power no lower than $P_{UL} \geq Q \cdot P_{DL}$. In various embodiments, if a threshold Q is only applied to a frequency gap smaller than a value Δf, then the N may allow a gap of at least Δf if the received power ratio is expected to exceed Q.

Figure 10:
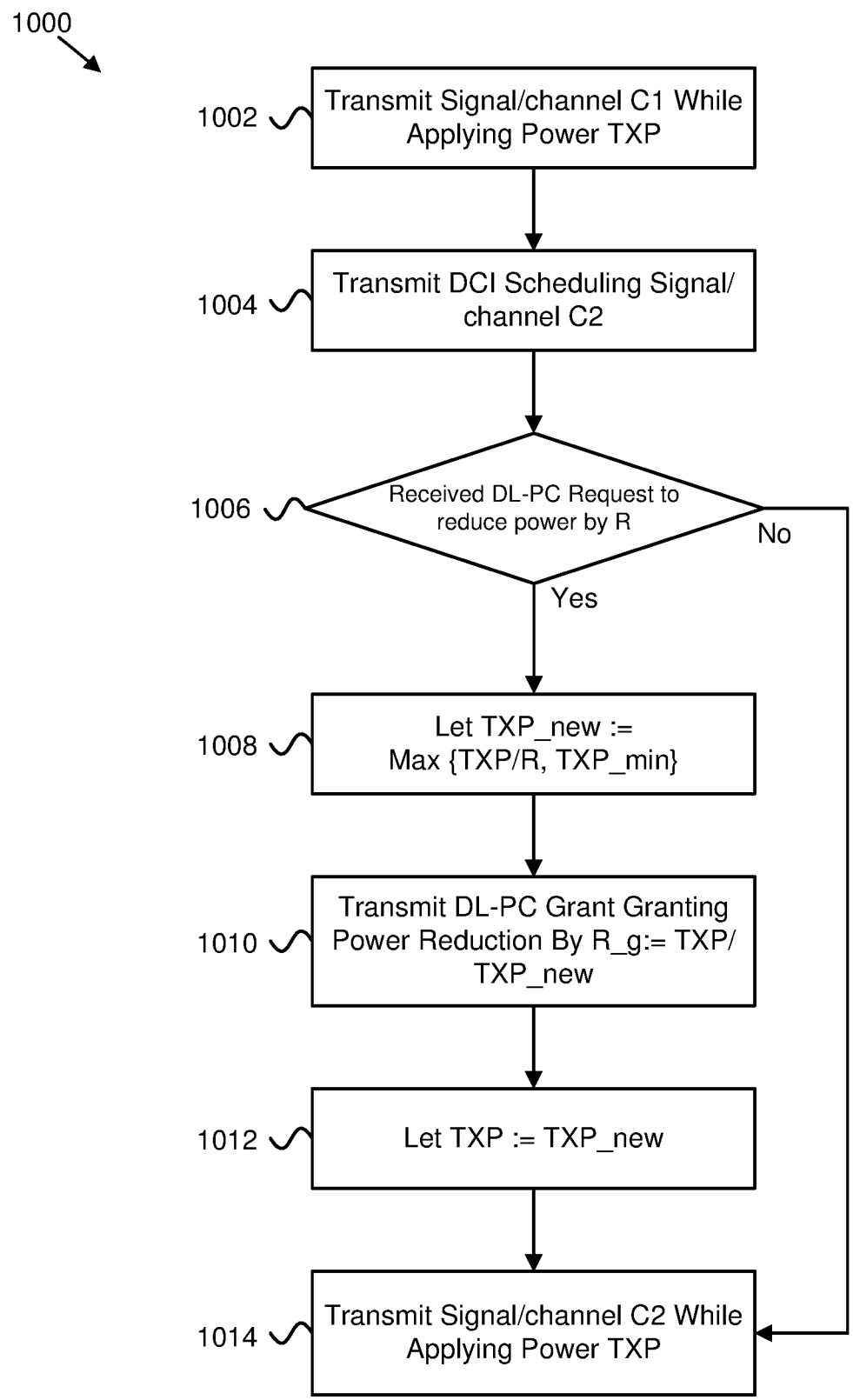
FIG. 10 is a flow chart diagram illustrating one embodiment of transmitting a DL-PC grant.

FIG. 10 is a flow chart diagram 1000 illustrating one embodiment of transmitting a DL-PC grant from a responding (upstream) IAB node.

A parent node (PN) transmits 1002 a signal and/or channel C1 to the IAB node N while the PN applies a transmission power TXP for this transmission.

Next, the PN transmits 1004 DCI to N that schedules a second signal and/or channel C2.

Then, the PN may optionally receive 1006 a DL-PC request from N to reduce the transmission power of C2 with respect to the transmission power of C1 by (at least) a ratio R.

If a DL-PC request is received, the PN may attempt to set a new transmission power TXP_new for C2 by letting 1008 TXP_new:=Max {TXP/R, TXP_min}. However, other constraints such as other concurrent transmissions may constrain the power reduction by a minimum TXP_min.

Next, the PN may transmit 1010 a DL-PC response informing the N that a power reduction of R_g is granted in which R_g:=TXP/TXP_new.

In certain embodiments, the PN may transmit a DL-PC response declining a power change.

The PN sets the transmission power TXP to the new value by letting 1012 TXP:=TXP_new.

Finally, the PN transmits 1014 signal and/or channel C2 while applying the transmission power TXP.

Figure 11:
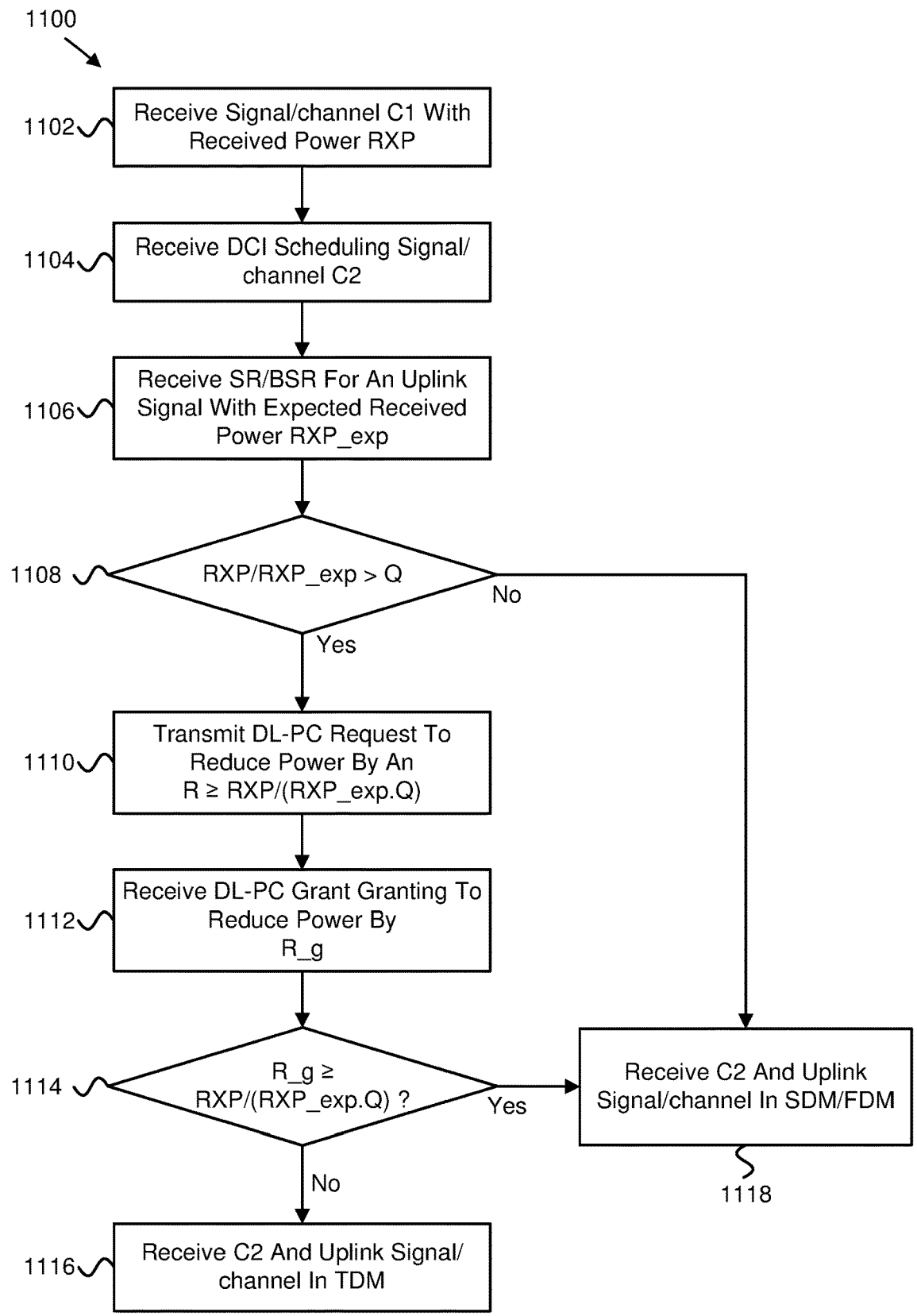
FIG. 11 is a flow chart diagram illustrating one embodiment of transmitting and receiving a DL-PC grant.

FIG. 11 is a flow chart diagram 1100 illustrating one embodiment of transmitting and receiving a DL-PC grant by a requesting (downstream) IAB node.

An IAB node N receives 1102 a signal and/or channel C1 from a parent node (PN) with received power RXP. The received power is the transmission power attenuated by a communication channel and other losses.

Next, the N receives 1104 DCI that schedules a second signal and/or channel C2 from the PN.

Furthermore, the N may receive 1106 SR and/or BSR from a UE or a child node (CN) for an uplink signal with expected received power RXP_exp. In certain embodiments, the N may want to receive uplink signals from the UE and/or CN simultaneously with receiving C2 (e.g., by employing FDM). However, the expected received power from the UE and/or CN may be constrained by RXP_exp.

The IAB node N may check 1108 whether the resulting power imbalance exceeds a threshold Q (e.g., RXP/RXP_exp>Q). If it does, the N may initiate a downlink power control signaling. Otherwise, the N may proceed with scheduling C2 and uplink signals simultaneously. The N may also perform uplink power control.

To perform downlink power control, the N may transmit 1110 a DL-PC request to PN to reduce the transmission power of C2 with respect to that of C1 by a requested power reduction ratio R (e.g., R≥RXP/(RXP_exp. Q)). The requested power reduction ratio may at least target a received power ratio less than the threshold Q.

Then, the N may receive 1112 a DL-PC response (e.g., DL-PC grant) from the PN that grants a power reduction ratio by R_g.

Next, the N compares 1114 the granted power reduction R_g by the minimum that satisfies the power ratio constraint (e.g., R_g≥RXP/(RXP_exp. Q)).

If the constraint is not satisfied, the N may schedule the uplink signals on resources that do not overlap with C2 in the time domain and may receive 1116 C2 and the uplink signals and/or channel in TDM.

If the constraint is satisfied, the N may have the option of scheduling the uplink signals on resources that overlap with C2 in the time domain and may receive 1118 C2 and the uplink signals and/or channel in SDM and/or FDM.

Figure 12:
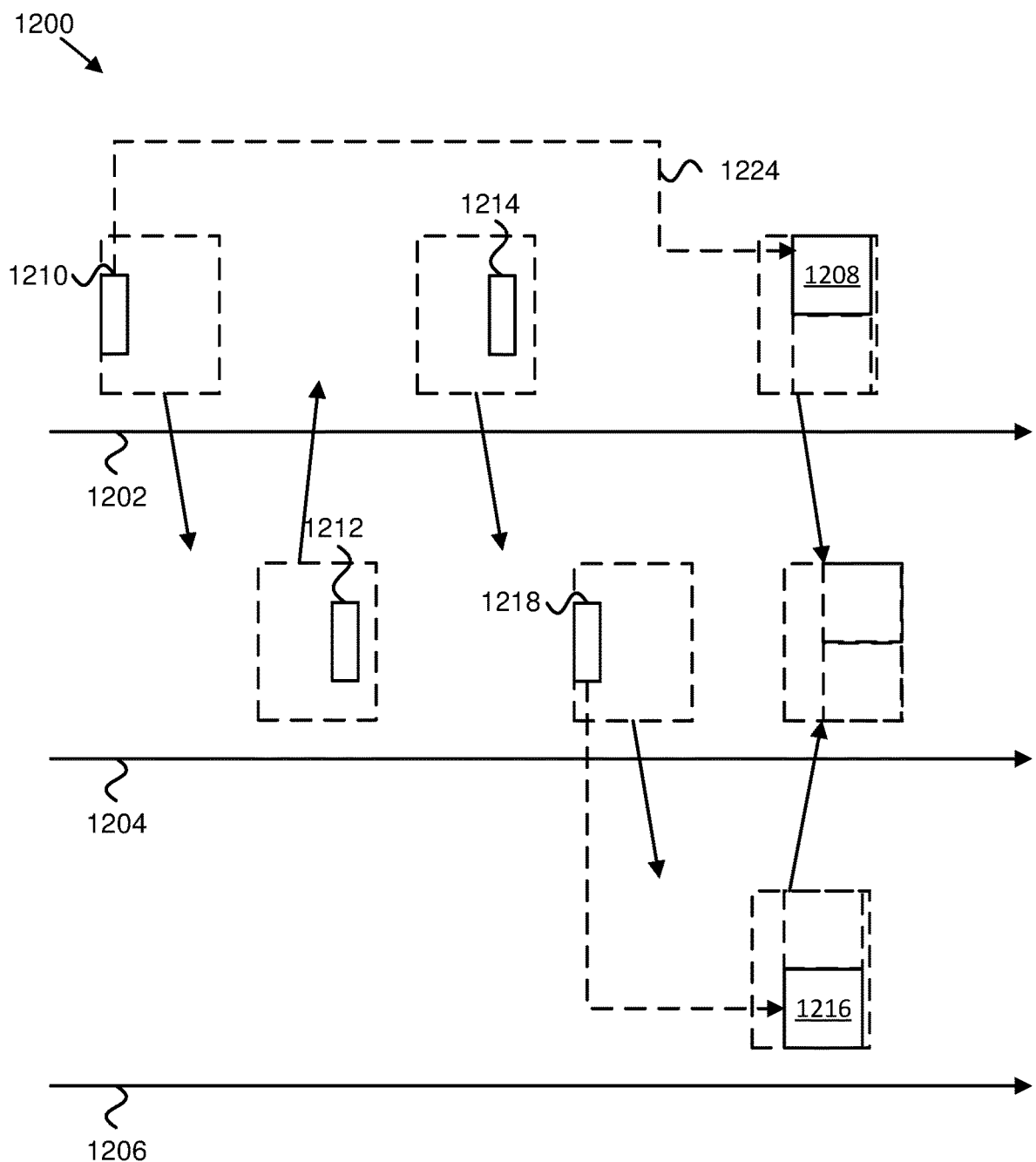
FIG. 12 is a timing diagram illustrating timing corresponding to a DL-PC request and DL-PC grant.

FIG. 12 is a timing diagram 1200 illustrating timing corresponding to a DL-PC request and DL-PC grant. The timing diagram 1200 illustrates timing 1202 corresponding to a parent IAB node (PN), timing 1204 corresponding to an IAB node (N), and timing 1206 corresponding to a child node (CN).

First, the PN schedules a PDSCH 1208 transmission using DCI 1210 transmitted to the N. Then, N sends a DL-PC request 1212 to the PN for a change in its downlink power for the transmission. The PN grants this request by sending a DL-PC grant message 1214 to the N. Having received the DL-PC grant message 1214, the N may schedule a PUSCH transmission 1216 using DCI 1218 for the CN that is frequency-domain multiplexed with the PDSCH 1208.

As may be appreciated, an advantage of the PORS method over the DL-PC request-grant method is that there is no signaling necessary between the scheduling of PDSCH and the scheduling of PUSCH. Indeed, since N has already obtained information through PORS configuration, the N may refer to latest power measurements from PN, power measurements from CN1 and/or CN2, and a reference power (e.g., ss-PBCH-BlockPower, referenceSignalPower, and so forth) to schedule PUSCH that is frequency and/or spatial-multiplexed with a PDSCH.

However, the PORS method and the DL-PC request-grant method may be similar. For example, consider the following for the PORS method: 1) a PN configures a PORS in an aperiodic manner and schedules a PDSCH to the N in the PORS; 2) the N realizes that it may be able to FDM a PUSCH transmission from CN if PORS takes a different power offset—then, it sends a power offset request to the PN; 3) then, the PN updates the power offset of the PORS through control signaling sent to the N; and 4) having obtained the update, the N schedules a PUSCH for CN on time resources that overlap with the time resources of the PDSCH. A similar procedure may be followed for the DL-PC request-grant method.

In various embodiments, a parent IAB node PN may exchange DL-PC control signaling with an IAB node N to adjust downlink transmission power for transmissions to N. The power adjustment and the information exchanged through control signaling may facilitate duplexing enhancements for the N.

In certain embodiments, uplink signaling may be used to inform a parent node of preferred power adjustments to enable simultaneous reception of downlink and uplink signals. Uplink signaling may be called a power offset request, a target received power request, and/or a DL-PC request.

In some embodiments, a power offset request or a DL-PC request may be produced based on implementation (e.g., a subject node may estimate an expected receive power RXP_exp from a CN and/or UE based on measurements on any signal or combination of signals from the CN and/or the UE).

In various embodiments, a method to obtain RXP_exp may be specified by a standard. For example, RXP_exp may be set to any of the following or a combination thereof: 1) a latest receive power of a PUCCH (e.g., a latest RSRP of a DMRS in a latest PUCCH transmission from a CN and/or a UE); 2) a latest receive power of a PUSCH (e.g., a latest RSRP of a DMRS in a latest PUSCH from the CN and/or the UE); and/or 3) an RSRP of an SRS from the CN and/or the UE.

In certain embodiments, a latest receive power or RSRP may be specified to be associated with a specific beam or a QCL parameter, especially in frequency range 2 (FR2). In some embodiments, uplink signaling may be carried by RRC, MAC, and/or physical layer signaling such as UCI).

In various embodiments, a power offset request may be associated with a PORS configuration. In certain embodiments, a subject node may request a power offset from a parent node without referring to a PORS configuration. The request message may include a desired power offset value or a range of power offset values with respect to a reference power. The reference power may be indicated implicitly or explicitly. For implicit indication, a standard or a prior configuration may determine a downlink reference power such as an RSRP of an SS/PBCH block or a CSI-RS as the reference. Another example of implicit indication may be an implicit reference to receive power from a latest downlink channel. For explicit indication, the request message may include a reference (e.g., an index) to a downlink reference signal such as an SS/PBCH block or a CSI-RS. In some embodiments, a subject node may request to change a power offset for a specific PORS configuration. In such embodiments, the request message may include a reference (e.g., an index) to an existing PORS configuration.

In certain embodiments, a DL-PC request may not make a reference to a specific channel or set of resources. In such embodiments, any such request may not be accommodated (e.g., may be at the discretion of a parent node).

In some embodiments, downlink signaling may be used to inform a subject node of an upcoming power adjustment (e.g., as a response to an earlier uplink signaling). The downlink signaling may be a PORS configuration or a DL-PC grant.

In various embodiments, a PORS configuration update or a DL-PC grant by a PN may be produced based on implementation (e.g., depending on multiple power offset requests or DL-PC requests received by the PN, transmission power limitations, regulatory constraints, and so forth). In certain embodiments, a power control request may not be accommodated (e.g., in ultra-dense deployments due to conflicting requests), and a decision about what requests to be granted may be left to implementation.

In some embodiments, a determination of which requests are accommodated may be specified in a standard document. For example, QoS provisions, higher layer signaling, and so forth may mandate a behavior of a parent node if receiving a power control request in the uplink. In another example, low-latency and/or wireless backhaul traffic may be given priority and a power offset request or a DL-PC request in association with the traffic may need to be accommodated based on a higher layer specification requirement and/or higher layer signaling.

In various embodiments, an IAB node may be able to provide power control capability to the rest of a network. For example, an IAB node may send information about its capability of receiving imbalanced signals to a parent node. Each piece of information may indicate a minimum frequency gap Δf, for example, in units of Hertz or PRBs, and an associated maximum power ratio Q, for example in decibels (dB). An IE containing the capability information may include a table, such as a table similar to Table 5.

TABLE 5

| Minimum Frequency Gap | Maximum Power Ratio |
| --- | --- |
| $\Delta f_1$ | $Q_1$ |
| $\Delta f_2$ | $Q_2$ |
| ... | ... |
| $\Delta f_N$ | $Q_N$ |

In certain embodiments, an IAB node capability for power control may include the following: 1) a number of panels; and/or 2) a maximum number of PORS configurations or maximum number of DL-PC processes.

In various embodiments, an information element containing capability information may be communicated with the rest of an IAB system and/or a network through higher layer signaling, such as by an RRC message (e.g., either automatically at a connection time or through request-response signaling). The capability information may be used by implementation, configuration, or specification.

In some embodiments, downlink power control in some slots or symbols may be constrained by a power allocated to signals and/or channels scheduled in those slots or symbols. For example, synchronization signals may be transmitted with a fixed power that cannot change dynamically. In another example, there may be periodic CSI-RS for RLM and RRM. In these examples, since the transmission power cannot change dynamically, a large power adjustment on other signals and/or channels may not be accommodated by a parent node.

In certain embodiments, one or more of the following rules may be specified by a standard and/or otherwise implemented: 1) a PORS cannot be configured on slots and/or symbols containing a SS/PBCH block, a periodic CSI-RS, or so forth; 2) a PORS configuration on slots and/or symbols containing a SS/PBCH block, a periodic CSI-RS, or so forth may be neglected; 3) a power offset in a PORS configuration on slots and/or symbols containing a SS/PBCH block, a periodic CSI-RS, or so forth constrained by a ratio Q with respect to a SSB-RSRP, a CSI-RSRP, and so forth; 4) a power offset request for a PORS configuration on slots and/or symbols containing a SS/PBCH block, a periodic CSI-RS, or so forth may be neglected or assumed invalid by any node of interest; 5) a DL-PC request for a channel on slots and/or symbols containing a SS/PBCH block, a periodic CSI-RS, or so forth may be neglected or assumed invalid by any node of interest; 6) if a PORS or channel includes any slot and/or symbol containing a SS/PBCH block, a periodic CSI-RS, or so forth, a rule may apply to a whole PORS or channel; and/or 7) a rule may apply not only if a SS/PBCH block, a periodic CSI-RS, or so forth is in a current BWP and/or CC, but also on another BWP and/or CC, such as with intra-band carrier aggregation.

In various embodiments, there may be a multi-hop scenario N1-N2-N3-N4, in which: N1 is a parent node of N2; N2 is a parent node of N3; N3 is a parent node of N4; and N4 may be a child node or a UE. In such embodiments, suppose N2 sends PORS configurations to N3 so that N3 will be able to enjoy simultaneous communications with N2 and N4. However, N2 may be a child node of N1 and this it must follow uplink TPC commands provided by N1. Moreover, N2 may be subject to power constraints for transmission as well, for example: 1) the power ratio between simultaneous uplink and downlink transmissions, to N1 and N3 respectively, may not exceed a threshold that may be determined by the standard or by a hardware capability of N2; and/or 2) hardware and/or regulatory constraints apply to a maximum transmission power of N2, which is the sum of transmission powers in uplink (to N1) and downlink (to N3) directions. Therefore, TPC commands from N1 may result in a conflict with a PORS configuration from N2.

In some embodiments, the following may apply: 1) N2 may remove the PORS configuration to avoid a power imbalance conflict—N2 may send a message to N3 informing it that the PORS configuration is no longer valid—in one embodiment, the PORS configuration may have an expiration time after which N3 may assume that the configuration is no longer valid; 2) N2 may update the PORS configuration to avoid the power imbalance conflict—specifically, N2 may send a message to N3 that updates the power offset value of the PORS or replaces the PORS configuration by a new PORS configuration—the new power offset may then allow power transmissions in uplink and downlink without imposing a large imbalance at N2; 3) N2 may refrain from scheduling downlink transmissions on the PORS as long as the conflict exists—consequently, if a PORS configuration is not used for a certain period, N3 may assume that the configuration is expired—an expiration period may be set by a standard or by a configuration; 4) N2 may be enabled to apply partial power compensation to avoid a conflict—for example, N2 may be enabled to deviate, by up to a certain amount, from transmission powers in uplink (e.g., determined by TPC commands from N1) and/or in downlink (e.g., determined by the PORS configuration); 5) N2 may send a control message to N1 that informs it of constraints to follow a TPC command—this control message may be, for example, a PHR— in which N2 produces the PHR based on the ratio between a transmit power and power constraints according to a PORS configuration, hardware and regulatory limitations, and so forth—the report may be a MAC layer message, and may be triggered and produced according to an RRC configuration; and/or 6) N2 may share PORS configuration information, fully or partially, with N1 and associate a power constraint report such as a PHR to a PORS configuration.

It should be noted that issues might be raised because of mobility or any other factor that changes a channel quality, such as path-loss, of any wireless links in a system. The embodiments described herein may be applicable to address any such issues.

In various embodiments, a subject node (N) may make scheduling decisions by implementation once it obtains expected receive powers in downlink and uplink. For example, the N may split its downstream nodes (e.g., UEs and child nodes) into groups that may be scheduled simultaneously with downlink channels that are expected to have a known power offset. Such grouping may be left to implementation. In some embodiments, signaling may be used to facilitate or automate a grouping process. For example, a UE or a child node (CN) in a group may be able to transmit only on specific resources (e.g., specific symbols or slots) which may correspond to resources in a PORS. In this example, since the UE and/or the CN may not be directly aware of the PORS configuration, the N may need to inform the UE and/or the CN through control signaling (e.g., dedicated grouping signaling).

In certain embodiments, a UE and/or a CN in a group may not be constrained to use resources in a resource set or a resource pool, but may be constrained to apply a transmission power that results in an expected value (or range of values) of receive power at a receiver.

In various embodiments, IAB nodes may have more flexibility in terms of power control in the uplink (e.g., because of fewer implementation constraints and/or fewer regulatory constraints). Uplink power control may be used by adding a partial compensation element to UL-PC, which may enable power imbalance to be compensated "half-way" by DL-PC and half-way by UL-PC. In some embodiments, uplink power control may be used based on implementation combined with predetermined signaling. For example, a UL-PC parameter may be included in communications associated with a PORS. Then, if a UE and/or CN is scheduled on resources in the PORS, the UE and/or the CN may be expected to apply additional UL-PC terms in a power control equation. This signaling may be combined with a UE and/or CN signaling.

One embodiment may be described with respect to scenario S1. In scenario S1, suppose that a question is whether it is possible for an IAB node N to receive downlink signals from its parent IAB node (PN) and uplink signals from {UE1, UE2, . . . , UEn} and/or child IAB nodes {CN1, CN2, . . . , CNm}. Furthermore, there may be interference from upcoming transmissions by other nodes {N1, N2, . . . , Nk}.

In scenario S1, to examine whether a specific resource allocation with a specific set of transmission powers allow the N to receive and decode all the signals, a probing time interval (e.g., one or a few symbols) may be designated by configuration. During the probing time interval, all the nodes of interest transmit reference signals on allocated PRBs while the N receives the signals and performs measurements. Based on the measurement results, the N may determine whether the resource allocation with the expected powers results in a decodable combination of signals.

Figure 13:
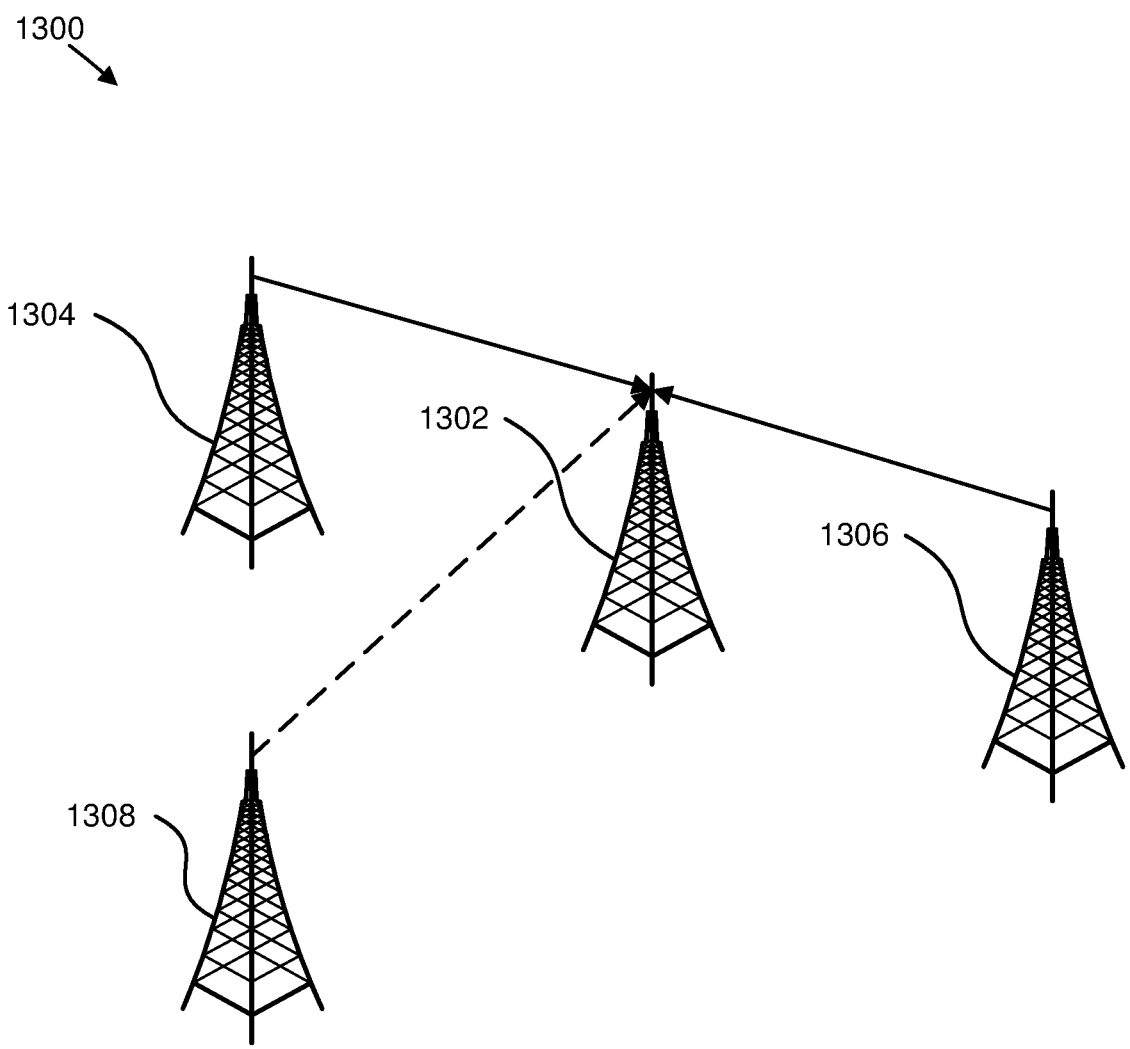
FIG. 13 is a diagram illustrating one embodiment of a system using probing.

An example system 1300 for a probing approach is illustrated in FIG. 13. In this example, an IAB node (N) 1302 may be scheduled to receive a PDSCH from a patent node (PN) 1304, the N 1302 may intend to schedule a PUSCH from a child node (CN) 1306, and the N 1302 may be subject to interference from an interfering node (N1) 1308.

In this system 1300, a probing interval may be configured before actual transmissions for the N 1302 to realize whether a PUSCH from the CN 1306 may be scheduled in the presence of the already scheduled PDSCH and interference. This is illustrated in FIG. 14.

Figure 14:
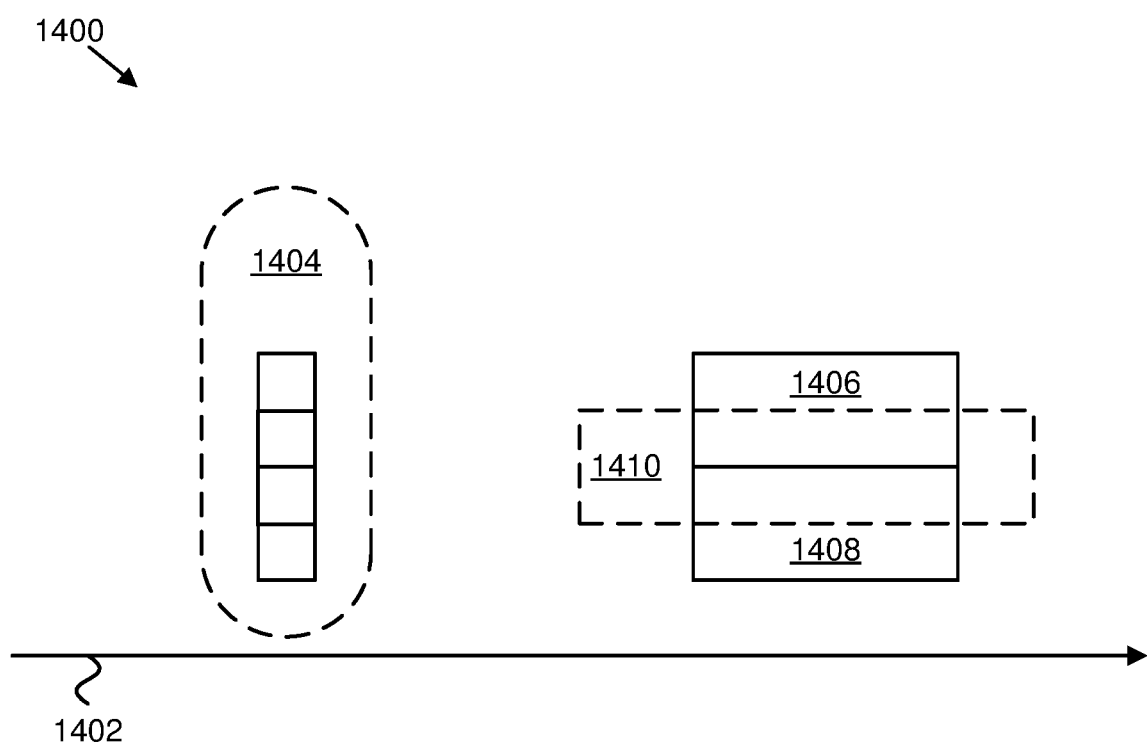
FIG. 14 is a timing diagram illustrating one embodiment of communications including probing.

FIG. 14 is a timing diagram illustrating one embodiment of communications 1400 including probing. The communications 1400 occur over a time 1402. At a first time, probing 1404 may occur. Then, at a second time, PDSCH 1406 may be received from the PN 1304, PUSCH 1408 may be received from the CN 1306, and interference 1410 may be received from the N1 1308.

It should be noted that an interference measurement may be implemented by cross-link interference (CLI) management mechanisms. Otherwise, the probing approach may be adopted for the purpose of addressing power imbalance without a need for CLI coordination.

As described herein, it may be assumed that a DCI message schedules shared and/or data channels. In some embodiments, DCI formats 1_0 and 1_1 may be specified for scheduling a PDSCH, and DCI formats 0_0 and 0_1 may be specified for scheduling a PUSCH. Embodiments of this disclosure may use the same or similar DCI formats for scheduling channels.

In certain embodiments, new DCI formats may be used to schedule a channel, indicate parameter values for a specific channel, trigger an aperiodic configuration, and/or for other purposes. The same and/or similar information may be carried by RRC or MAC signaling.

As may be appreciated, configurations and related signaling described herein may be beam-based (e.g., a behavior related to a resource, a signal, or a channel may be associated with a spatial QCL). For example, if a subject node N intends to schedule a PUSCH from a CN that is quasi-collocated with a reference signal with respect to spatial Rx parameters, the N may obtain an expected receive power (RXP_exp) by measuring an RSRP of a reference signal that is quasi-collocated with the reference signal with respect to spatial Rx parameters.

Embodiments described herein may be implemented on time-frequency resources with mixed numerology (e.g., different values of OFDM symbol duration and subcarrier spacing). Appropriate conversion of values may be expected to take the effects of mixed numerology into account. For example, if a power control is applied on a resource, all the resources overlapping fully or partially in the time-domain with the resource may follow the rules for FDM signals.

In various embodiments, frequency resources in a PORS may be indicated implicitly or explicitly. Examples of implicit indication may be a BWP or a whole CC. Moreover, in some embodiment, uplink signals from a child IAB node may be distinguished from uplink signals from a UE.

In certain embodiments, transmit power setting may be used to address a transmit power imbalance (e.g., if a transmit power setting is required for simultaneous operation, such as between upstream and downstream links).

In some embodiments, an IAB node (N) determines downlink transmit power to be transmitted to a child node (CN) or a UE (e.g., for transmitting a PDSCH) based on uplink power control parameters received from a parent node (PN). The uplink power control parameters may include open-loop power control parameters such as $P_0$ and $\alpha$. In addition, the N may receive TPC commands for closed-loop dynamic adjustments of its uplink transmit power.

In various embodiments, IAB systems may be designed to enable flexible deployments, including deployment in mobile and dynamic environments, support different deployment densities, and/or for other purposes. In some embodiments, there may be a means for an IAB node to serve IAB nodes and UEs in highly unbalanced situations in terms of channel quality. In an arbitrary IAB deployment where an IAB node N is serving several child nodes and UEs, each child node or UE may demand a different range of transmit power values due to different values of path-loss and so forth. Therefore, one setting of transmit power values by the PN may be to not enable the N to multiplex communications in upstream and downstream for a wide range of CNs and/or UEs, which consequently may result in lower resource efficiency and higher latency.

In certain embodiments, a PN may configure different uplink transmit power control parameters for different sets of resources (e.g., for different symbols and/or slots). The configuration may be semi-static to enable each IAB node served by the PN to schedule downstream communications with its CNs and/or UEs in a timely manner. The configuration of uplink transmit power control parameters for a resource set may be referred to herein as a power-controlled resource set (PCRS) configuration and may include one or more messages, but may be referred to by any suitable name.

In various embodiments, a PCRS configuration may be made using an RRC information element (JE) including one or more of the following parameters: 1) an ID for the configuration; 2) a resource set: a) resources in time: slots, symbols, periodicity of occurrence, and so forth, and/or b) resources in frequency: PRB, BWP, CC, and so forth; 3) power control parameters (e.g., $P_0$, $\alpha$); and/or 4) beam-based information (e.g., spatial QCL with respect to a reference signal).

In some embodiments, information included in a PCRS configuration may instead be included in another configuration such as a slot configuration, a multi-purpose resource configuration, and/or another configuration.

In certain embodiments, a PCRS configuration may be used to associate power control parameters to communications in a set of resources (e.g., on a time-frequency grid) so that an IAB node N acquires upstream power control information in advance and may schedule downstream communications accordingly. Furthermore, provided that power control parameters for different resource sets cover a sufficiently wide range of upstream power values, a proportionally wide range of downstream power values may be used.

Once an IAB node N receives a PCRS configuration, it may proceed with scheduling communications with CNs and/or UEs.

Figure 15:
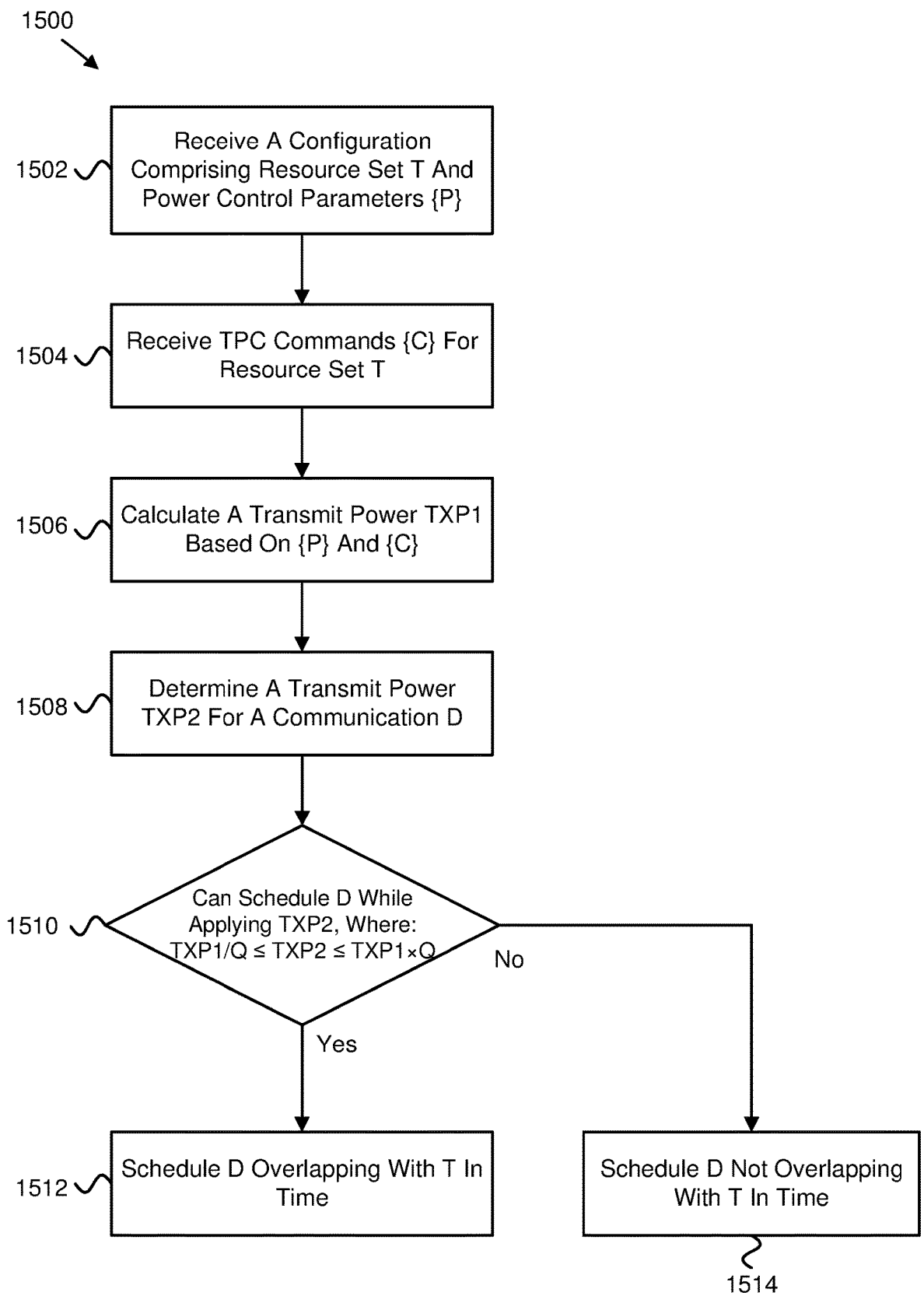
FIG. 15 is a flow chart diagram illustrating one embodiment of a method for determining transmit power settings.

FIG. 15 is a flow chart diagram illustrating one embodiment of a method 1500 for determining transmit power settings (e.g., performed at an IAB node (N)).

First, the N receives 1502 a PCRS configuration including a resource set T and power control parameters {P}. The configuration PCRS may be an RRC JE, be included in an RRC JE, and/or be part of another IE. The PCRS configuration may be received from a parent node (PN), and may be produced by the PN or the CU of an IAB donor.

Next, the N may receive 1504 TPC commands {C} (e.g., for resource set T) from the PN.

Then, given the PCRS configuration parameters and the TPC commands, the N calculates 1506 a transmit power or an interval and/or range of possible transmit power TXP1 for uplink and/or upstream communications with the PN (e.g., based on {P} and {C}). When the N calculates TXP1, a communication may or may not have been scheduled on the resource set T.

The N determines 1508 a second transmit power TXP2 for a downlink and/or downstream communication D with a child node (CN) or a UE. The N may determine a value of TXP2 or a range of possible values for TXP2 based on channel measurements performed by the N, the CN, and/or the UE.

Next, the N may determine 1510 whether the downlink and/or downstream communication D may be scheduled simultaneously with an uplink and/or upstream communication with the PN (e.g., whether the N can schedule D while applying TXP2, where: TXP1/Q≤TXP2≤TXP1xQ). To this end, the N may compare the values of TXP1 and TXP2. If a power imbalance between TDM'ed communications does not exceed a threshold Q, the N may need to make sure that the ratio between TXP1 and TXP2 does not exceed this threshold for scheduling D on time resources that overlap with time resources in T. It should be noted that N may consider a guard period before and/or after time resources in T. The N may consider a frequency domain separation value (e.g., in number of RBs) between the resources for D and the resource set T (e.g., based on a power imbalance between TXP1 and TXP2).

In FIG. 15, it may be assumed that Q is expressed in the real scale and it is a value greater than or equal to 1. The value of Q may depend on a node capability and/or may be determined by a standard, by a semi-static configuration, and/or by a dynamic indication.

If the ratio between TXP1 and TXP2 is within the threshold Q, the N may schedule 1512 D on resources that overlap with T in time.

Otherwise, the N may not schedule 1514 D on resources that overlap with T in time.

In certain embodiments, the decision in step 1510 may be based on whether the ratio between TXP1 and TXP2 exceeds a threshold Q, while in other embodiments the decision in step 1510 may include other considerations. For example, a total transmit power may be constrained. The constraint may be determined by at least one of a node capability, an emission regulation, a value set by the standard, and/or a configuration and/or indication by an IAB system. In some embodiments, if N realizes that co-scheduling uplink and/or upstream communication and downlink and/or downstream communication results in exceeding a power constraint, it may not schedule D on resources overlapping with T in time.

In various embodiments, there may be a system in which a power imbalance constraint Q may be determined in terms of an average (e.g., an energy per resource element (EPRE)), while a total power constraint may be determined by a maximum total energy on all resource elements. In such embodiments, a decision that N makes in step 1510 may be whether a certain resource allocation for the downlink and/or downstream communication D spreads a certain amount of transmission energy over an allocated set of REs in a way that satisfies both of the constraints. For example, consider that an upper limit on the transmission energy for D is obtained by subtracting the energy required for an uplink and/or upstream communication from a total energy constraint. Then, if there is also a lower limit on an EPRE for D based on a power imbalance constraint Q, then there is a maximum number of REs that may be allocated to D. The N may consider this constraint on resource allocation in order to determine whether it may proceed to step 1512 or step 1514.

In some embodiments, an IAB node transmits SS/PBCH blocks and/or CSI-RS for the purpose of mobility management. In such embodiments, IAB nodes and UEs perform measurements on these reference signals to determine whether a current serving cell is appropriate or if it is better to perform a handover to another cell.

In certain embodiments, if an N configures SS/PBCH blocks or CSI-RS for mobility, these reference signals may or may not overlap with a power-controlled resource set. If the reference signals do overlap, the power for transmission of the reference signals may be limited by the total power minus the power that may be allocated to the uplink and/or upstream communications. Therefore, the N may allocate a transmit power to the reference signals semi-statically based on open-loop power control parameters configured for those resources.

In various embodiments, if dynamic TPC commands increase a share of a transmit power that is needed for uplink and/or upstream communications, a lower share remains for transmission of reference signals. Since reference signals for mobility are supposed to remain consistent for the stability of a system topology, the N may not be able to change the transmit power of the reference signals dynamically. In some embodiments, the N may reduce a transmit power for reference signals and maintain a power consistent for a minimum period. The minimum period may be determined by a standard or by a system configuration. In certain embodiments, the N may apply an upper limit for how dynamically it follows the TPC commands. In some embodiments, the N may reschedule or remove reference signal configurations in order to follow with TPC commands.

In some embodiments, a handover decision moves a UE from one cell to another cell. In an IAB system, an effect may be larger because a handover of an IAB node MT may lead to topology changes. Therefore, an IAB node may need to consider other criteria such as load balancing in addition to mobility-related measurements to make a decision to perform a handover. In such a system, consistent transmission of reference signals for mobility may be important. Therefore, an IAB node may be provided control signaling to inform a parent node (PN) of limitations it has on downlink and/or downstream communications such as for mobility-related reference signals.

In certain embodiments, a PH may be a difference between a nominal UE maximum transmit power and an estimated power for a transmission. The estimated power for a transmission may not be the actual and/or used power for the transmission, but the transmit power that would have been used had there been no upper limit on the transmit power. Accordingly, the PH level may be positive or negative. A negative PH level may indicate an amount by which the transmit power of the transmission is limited by the nominal UE maximum transmit power. For PUSCH transmission, a negative PH level may indicate that the network has scheduled a higher data rate than the UE can support given the available transmission power. The network may then adjust the uplink data rate accordingly so that the UE is no longer power-limited. The power headroom may be calculated by subtracting a power needed for transmitting signals on a PUSCH from a maximum total transmit power of the UE. The UE may report the power headroom periodically by MAC signaling according to a configuration from the serving cell.

For example, if a UE transmits PUSCH in PUSCH transmission occasion i on UL BWP b of UL carrier f of serving cell c, the UE computes an actual power headroom in [dB] for a Type-1 report. Thus, if the UE determines that a Type-1 power headroom report for an activated serving cell is based on an actual PUSCH transmission, then for PUSCH transmission occasion i on active UL BWP b of carrier f of serving cell c using open-loop parameter set configuration with index j and pathloss reference with index $q_d$ and PUSCH power control adjustment state with index l, the UE computes the Type-1 PHR (a.k.a., PUSCH PHR) as: $PH_{type1,b,f,c}(i, q_d, l) = P_{CMAX,f,c}(i) - \{P_{O\text{-}PUSCH,b,f,c}(j) + 10 \log_{10}(2^\mu \cdot M_{RB,f,c}^{PUSCH}(i)) + \alpha_{b,f,c}(j) \; PL_{b,f,c}(q_d) + \Delta_{TF,b,f,c}(i) + f_{b,f,c}(i, l)\}$ (Equation 1), where the Power Headroom of Equation 1 is in [dB] and all parameters are defined in 3GPP TS 38.213. In particular, the configured maximum UE output power, $P_{CMAX,f,c}$, is separately determined for each uplink carrier f of serving cell c. If the UE does not transmit PUSCH in PUSCH transmission occasion i on UL BWP b of UL carrier f of serving cell c, then the UE cannot report an actual power headroom. This is due to the fact that if there is no PUCCH and/or PUSCH transmission in transmission occasion i, then $P_{CMAX,f,c}(i)$ cannot be determined. The UE instead reports a "virtual" power headroom based on a reference PUSCH transmission. Accordingly, if the UE determines that a Type-1 PHR for an activated serving cell is based on a reference PUSCH transmission, then for PUSCH transmission occasion i on active UL BWP b of carrier f of serving cell c, the UE computes the Type-1 power headroom in [dB] as: $PH_{type1,b,f,c}(i, j, q_d, l) = \tilde{P}_{CMAX,f,c}(i) - \{P_{O\text{-}PUSCH,b,f,c}(j) \cdot PL_{b,f,c}(q_d) + f_{b,f,c}(i, l)\}$ (Equation 2), where $\tilde{P}_{CMAX,f,c}(i)$ is computed assuming MPR=0dB, A-MPR=0dB, P-MPR=0dB, $\Delta T_C$=0dB, where MPR ("maximum power reduction"), A-MPR ("additional maximum power reduction), P-MPR ("power management maximum power reduction") and $\Delta T_C$ are power reduction and/or backoff terms. These power reduction and/or backoff terms are all defined in 3GPP TS 38.101.

In some embodiments, a UE may determine a Type-3 power headroom report for an activated serving cell based on an actual SRS transmission or a virtual Type-3 PHR based on a reference SRS transmission as described in TS 38.213.

In certain embodiments, an IAB node MT considers not only a maximum transmit power based on a node capability or a standard specification, but also based on a power needed for downlink and/or downstream communications. A PHR from an IAB node may be associated with a power-controlled resource set, which essentially limits the range of uplink transmission power for that resource set. Then, the IAB node may use the resource set to transmit reference signals for mobility and/or other downlink and/or downstream signals that have more stringent power requirements.

In some embodiments, if a transmit power control TXP2 is allocated to reference signals or other downlink communications D, then, the IAB node may consider TXP2xQ as well as any total transmit power constraint to produce a power headroom report. If D overlaps in time with a resource set T in a PCRS configuration, then the PHR can be associated with T such that the parent node (PN) applies the power headroom information for communications that it will schedule on T.

In one embodiment, $P_{CMAX,f,c}$, may be determined or configured for an IAB node MT power-controlled resource set. In another embodiment, an IAB node MT may individually or in addition determine a $P_{CMAX,f,c}$, based on a transmit power control TXP2 allocated to reference signals or other downlink communications D. In certain embodiments, a maximum power reduction needed for multiplexing downlink and/or downstream communications from an IAB node (e.g., and uplink and/or upstream communication transmitted to the PN) may be included in a P-MPR term or a new term may be defined (e.g., IAB-P-MPR for a multiplexing MPR used for computing $P_{CMAX,f,c}$). An IAB node MT may indicate the $P_{CMAX,f,c}$ and/or the IAB-P-MPR in the PHR to the PN. The PHR (e.g., actual or virtual) may be associated with a power-controlled resource set (e.g., corresponding to PUSCH, PUCCH, and/or SRS transmission on a resource of a resource set T). In one example, an ID of the power-controlled resource set associated with the PH may be reported in the PHR.

In various embodiments, base stations may be central controllers of a cell and UEs may follow their instructions for scheduling, power control, timing alignment, and so forth. UEs may be expected to follow base station and network instructions tightly and provide feedback in the form of CSI reports, HARQ ACK feedback, PHR, and forth to assist the base station with controlling a cell. However, in an IAB system, IAB nodes may be responsible for controlling their own cells and may be provided means of cancelling a communication despite an instruction from a serving cell.

In certain embodiments, upon determining that a transmit power for an uplink communication exceeds a threshold, an IAB node may cancel an uplink transmission. The IAB node may determine a threshold based on a power it has allocated to a downlink and/or downstream signal, such as periodic reference signal for mobility. The IAB node may further inform a serving cell (e.g., by a PHR including a negative value) that an uplink and/or upstream communication is cancelled for a power control reason.

In some embodiments, a downlink communication may be cancelled by an IAB node upon determining that an uplink communication requires a transmit power higher than formerly expected. The IAB node may further inform the downstream node (e.g., CN and/or UE) of the cancelation, or may handle the error by a HARQ transmission.

In various embodiments, an IAB node may determine which communication, uplink and/or upstream or downlink and/or downstream has a higher priority. A priority may be determined by at least one of a QoS parameters such as a QCI, a redundancy version (RV), a signal type, and so forth. For example: 1) a signal with a more stringent QoS constraint may be given higher priority; 2) a transport block with a higher RV may be given higher priority; 3) a periodic reference signal for mobility may be given higher priority; 4) a reference signal may be given higher priority compared to a control or shared channel; and/or 5) a control channel may be given a higher priority than a shared channel.

In certain embodiments, if a higher priority signal is an uplink and/or upstream signal, then a downlink and/or downstream signal is cancelled, and if the higher priority signal is a downlink and/or downstream signal, then the uplink and/or upstream signal may be cancelled.

In some embodiments, there may be two types of resource set configurations: 1) a PORS makes an association between a power offset (e.g., from a reference signal such as an SS/PBCH block) or a received target power setting for a resource set, mainly for a downlink resource set; and 2) a PCRS makes an association between power control parameters for a resource set, mainly for an uplink resource set.

In various embodiments, a configuration may be made by an independent RRC IE, may be included in other configurations, or may be made by control signaling.

In certain embodiments, IAB systems may be expected to leverage flexible resource configurations that enable an IAB node to share resources in upstream and downstream directions. Resources may be configured as flexible (F) at a symbol level, which can be then indicated as DL or UL for each instance. Furthermore, a resource may be configured as hard, soft, or not available at a symbol level for an IAB node. If a resource is configured as hard (H), it is always available, if it is configured as soft (S), it needs to be indicated as available for each instance, and if it is configured as not available (NA), the IAB node cannot use the resource for scheduling communications. The combination of {DL, UL, F, H, S, NA} and availability indications for soft resources (by DCI) may provide a high level of flexibility for scheduling in an IAB system.

In some embodiments, since upstream and downstream resources may be shared, an IAB node may receive a combination of a PORS configuration and a PCRS configuration, namely a configuration that associates both power offset parameters (e.g., mainly for downlink) and power control parameters (e.g., mainly for uplink). Then, the IAB node considers {DL, UL, F, H, S, NA} configurations and availability indications (e.g., by DCI) for determining what power control parameters are applicable to what time resources (e.g., slots, symbols, and so forth).

Furthermore, in various embodiments, an IAB node may not indicate in a signaling to a PN or a CN and/or a UE which time resources in a resource set are associated with the signaling. Instead, the associated time resources may be inferred by knowledge of resource configurations and availability indications of IAB nodes. This may be feasible because an IAB node may inform other nodes of its resource configurations. For example, if a slot in a PORS and/or PCRS configuration includes DL and UL symbols, the IAB node may inform its parent node of the slot configuration. Then, a PHR transmitted from the IAB node to its parent node may refer to a whole slot without indicating explicitly which symbols in the slot are configured as UL. However, since the parent node is aware of the configuration, it may infer the information and consider the PHR report only for the UL symbols in the slot.

In certain embodiments, power control configurations such as PORS and PCRS configurations may be provided by a CU of an IAB donor. In such embodiments, IAB nodes in an IAB system served by an IAB donor may be able to communicate power control configurations to improve coordination, control interference, and so forth. Accordingly, signaling may be provided by higher layers (e.g., over an F1 interface) and may be periodic, semi-persistent, aperiodic, or based on a request-response protocol.

In some embodiments, there may be details on how to apply various methods to address power control issues in different scenarios.

In various embodiments, in a scenario S2, a single-panel IAB node (N) may receive downlink signals from a parent node (PN) and may transmit downlink signals to a child node (CN) or a UE simultaneously. This is an example of full-duplex (FD) wireless communications. FD wireless may be rare in practice and FD radio devices may be expected to require stringent power control conditions for operation. However, FD may be used in various embodiments.

Moreover, simultaneous transmission and reception in scenario S2 may depend on a node's capability, which may be reported to other nodes in a system proactively or upon request. The capability may include constraints based on transmission power and reception power if: 1) resources are overlapping (e.g., the same time-frequency resources are used for both transmission and reception); and/or 2) resources are not overlapping (e.g., transmission and reception are FDM'ed).

In scenario S2, a system and method may include one or more of: 1) the N reports a capability to the PN or to the CU of the IAB donor; 2) the N receives a PORS configuration including: a resource set and/or a power offset associated with the resource set with respect to a reference signal such as an SS/PBCH block or a CSI-RS; 3) the N receives the reference signal and performs measurements on the reference signal to obtain a reference power such as an SSB-RSRP or a CSI-RSRP; 4) the N calculates a target receive power based on the measurement and the power offset in the PORS configuration; and/or 5) if possible based on channel conditions and the node's capability, the N sets a transmit power for a downlink communication to a CN and/or a UE on resources that overlap with the resource set in the PORS configuration in either or both of time and frequency domains.

It may be noted that information of the downlink transmission power obtained through receiving the PORS configuration on a resource set T may enable the N to produce and transmit a PORS configuration of its own on the resource set T, which may be sent to child IAB nodes or UEs served by the N. In various embodiments, some or all PORS configurations may be produced at a CU and communicated to IAB nodes by higher layers.

In certain embodiments, a DL-PC request-grant method may be extended to address scenario S2. For this purpose, the N may need to evaluate a range of transmission power suitable for a downlink transmission to a CN and/or a UE and send a request to a PN to make an adjustment to its downlink transmission power to the N on resources that overlap, in either or both time and frequency, with the downlink communication to the CN and/or the UE.

In some embodiments, in a scenario S3, a single-panel IAB node (N) transmits both to a parent node (PN) and to a child node (CN) or a UE. In scenario S3, uplink transmissions from the N to the PN may be power-controlled by the PN while the power of downlink transmissions transmitted from the N to the CN and/or the UE may be up to implementation.

In scenario S3, since only the uplink transmission is power-constrained, the N may be able to balance power between the transmissions by implementation. In various embodiments, in scenario S3, a method may include: 1) signaling for power control; 2) configuration rules; 3) rules for preserving a transmission power of SS/PBCH, periodic CSI-RS, and so forth; and/or 4) implementation methods.

In scenario S3, consider the PN-N-CN and/or the UE in which: the PN provides a serving cell for the N, and the N provides a serving cell for the CN and/or the UE.

In certain embodiments, in scenario S3, the N may transmit signals simultaneously to the PN and the CN and/or the UE through a single antenna panel. Particularly, the N transmits signals on a PUSCH to the PN and a PDSCH to the CN and/or the UE, where the PUSCH and the PDSCH are FDM'ed fully or partially. The methods for other channels may be similar.

In various embodiments of scenario S3, the N may be informed of power control parameters in advance through a configuration, which may be called a PCRS configuration. A PCRS configuration may include the following parameters: 1) an ID for the configuration; 2) a resource set: a) resources in time: (e.g., slots, symbols, periodicity of occurrence, and so forth), b) resources in frequency: (e.g., PRB, BWP, CC, and so forth); 3) power control parameters (e.g., $P_0$ and $\alpha$); and/or 4) beam-based information (e.g., spatial QCL with respect to a reference signal).

In some embodiments, a method for an IAB node receiving a PCRS configuration may include one or more of: 1) the N reports a capability to the PN or to the CU of the IAB donor; 2) the N receives a PCRS configuration including: a resource set and a set of power control parameters associated with the resource set; 3) the N receives TPC commands; 4) the N calculates a target transmit power based on the PCRS configuration and TPC commands for an upcoming uplink transmission; and/or 5) if possible based on channel conditions and the node's capability, the N sets a transmit power for a downlink communication to a CN and/or a UE on resources that overlap with the resource set in the PCRS configuration in either or both of time and frequency domains.

It should be noted that information of the uplink transmission obtained through receiving the PCRS configuration on a resource set T may enable the N to produce and transmit a PORS configuration on the resource set T, which may be sent to child IAB nodes or UEs served by N. In certain embodiments, some or all PCRS and PORS configurations may be produced at a CU and communicated to IAB nodes by higher layers.

In various embodiments, a DL-PC request-grant method may be extended to address scenario S3. For this purpose, an N may need to evaluate a range of transmission power suitable for a downlink transmission to a CN and/or a UE and send a request to a PN to make an adjustment to its uplink transmission power from the N on resources that overlap, in either or both time and frequency, with the downlink communication to the CN and/or the UE.

In some embodiments, to enable FDM between a PUSCH transmission and a PDSCH transmission, a PN may transmit first DCI (e.g., DCI1) that schedules the PUSCH transmission sufficiently in advance. Once the N receives and decodes the DCI1, it may consider the following matters to assess whether it may schedule a PDSCH transmission on overlapping time resources: the resources scheduled for the PUSCH transmission and/or the power required for transmission of PUSCH signals.

In certain embodiments, if the N realizes there are sufficient resources and power remaining for scheduling a simultaneous channel, the N may produce and transmit second DCI (e.g., DCI2) that schedules a PDSCH transmission to be transmitted to a CN and/or a UE.

In various embodiments, a time gap between DCI1 and the scheduled PUSCH transmission may be controlled by a higher layer parameter k2 in RRC IE PUSCH-TimeDomain-ResourceAllocation. The higher layer parameter k2 may be set to a minimum time that the N requires to decode DCI1 plus a minimum time that the N is required to transmit DCI2. That is: k2_min(PN):=T_min(N)+k0_min(N).

In this equation, k0_min(PN) is the minimum value of k2 for a PUSCH transmission from the N to the PN, T_min(N) is the minimum time the N needs to decode DCI1 from the PN, and k0_min(N) is the minimum value of k0 for a PDSCH transmission transmitted from the N to the CN and/or the UE. The higher layer parameter k0 may be determined by the RRC IE PDSCH-TimeDomainResourceAllocation.

In one example, there may be a 2-hop system PN-N-UE. In this example, the PN schedules a PUSCH transmission for the N and the N schedules a PDSCH transmission for the UE. Since the N may schedule a PDSCH transmission for the UE with k0=0, k0_min(N):=0 may be set. Then, k2_min (PN) may only depend on a minimum decoding time for the N, which may be set to a constant T_min(N):=T_min.

In another example, there may be a 3-hop system PN-N-CN-UE. In this example, {PN, N, CN} may schedule {PUSCH, PDSCH, PUSCH} for {N, CN, UE}, respectively. Then, the minimum value for k0 may take the following recursive form:

$$k2\_min(PN):=T\_min(N)+k0\_min(N)$$

$$k0\_min(N):=T\_min(CN)+k2\_min(CN)$$

Since CN may schedule a PDSCH for UE with k2=0, k2 min(CN):=0 may be set. Therefore:

$$k0\_min(N):=T\_min(CN)$$

$$k2\_min(PN):=T\_min(N)+T\_min(CN)$$

Assuming that T_min(N):=T_min(CN):=T_min, we obtain:

$$k2\_min(CN):=0$$

$$k0\_min(N):=T\_min$$

$$k2\_min(PN):=2\times T\_min$$

This recursive rule may be extended to a larger number of hops. For example, in an m-hop IAB system Nm- . . . -N1-N0-UE, assuming that all values of minimum DCI decoding time are identical, we have:

$$k\_min(N0) := 0$$

$$k\_min(N1) := T\_min$$

$$k\_min(Nm) := m \times T\_min$$

In the above equations, k_min is either k0 min or k2 min as appropriate.

It should be noted that since an IAB node may not be aware of the number of hops at the RRC layer, the minimum threshold for k0 or k2 may be made configurable by higher layers.

Suppose an IAB node receives the following higher-layer parameters in one or more configurations: 1) T: a set of resources T (e.g., slots and PRBs) (optional); 2) k0: a minimum value for k0 (optional); 3) k2: a minimum value for k2 (optional); and/or 4) CN_ID: a set of child IAB nodes of the IAB node (optional). Default values may be set as follows: 1) if T is not set, let T be all available resources; and 2) if CN_ID is not set, let CN_ID be the set of all child IAB nodes of the IAB node.

In certain embodiments, consider an IAB node that is a recipient of DCI scheduling a PUSCH transmission. If the IAB node intends to schedule a PDSCH transmission simultaneously with the PUSCH transmission, it may execute the following steps: 1) receive and decode the DCI; and 2) does the value of k2 enable scheduling a PDSCH transmission with a k0≥k0_min?: a) if yes, then schedule a simultaneous PDSCH transmission if resource and power considerations allow, b) if no, then do not schedule a simultaneous PDSCH transmission.

In various embodiments, consider an IAB node that is a recipient of DCI scheduling a PDSCH transmission. If the IAB node intends to schedule a PUSCH transmission simultaneously with the PDSCH transmission, it may execute the following steps: 1) receive and decode the DCI; and 2) does the value of k0 enable scheduling a PDSCH transmission with a k2≥k2_min?: a) if yes, then schedule a simultaneous PUSCH transmission if resource and power considerations allows, b) if no, then do not schedule a simultaneous PUSCH transmission. As may be appreciated elements described in relation to scenario S3 may apply to other scenarios.

In some embodiments, the N may follow power control by the PN only as long as it does not cause a conflict with the power-constrained downlink signals. The N may transmit a PHR considering a power constraint introduced by downlink signals. The PHR may be associated with slots and/or symbols that contain the power-constrained downlink signals.

In certain embodiments, the PN may have the ability to be made of power-constrained resources for the N. Then, either the PN does not schedule communications with the N on those resources that would require N to violate power constraints, or the PN does not expect the N to follow regular power control procedures for any communications on the power-constrained slots and/or symbols.

In various embodiments, duplexing and/or multiplexing capabilities of an IAB node as well as a node's tolerance of power imbalance may be used in decision-making. An IAB node's decision may impact producing and transmitting closed-loop TPC commands, maintaining and updating power control configurations (e.g., PORS, PCRS, and so forth), and so forth.

In some embodiments, configuration rules may set minimum values of k0 and/or k2 that may be defined by standard specifications, or may be left to implementation.

In certain embodiments, a collective ability of a system to schedule communications efficiently may affect a system's behavior at higher layers for processes such as admission control for guaranteeing a required QoS.

In various embodiments, in a scenario S4, a single-panel IAB node (N) may transmit uplink signals to a parent node (PN) and may receive uplink signals from a child node (CN) or a UE simultaneously. This is another example of full-duplex (FD) wireless communications. Similarly to scenario S2, simultaneous transmission and reception in scenario S4 may depend on a node's capability.

In scenario S4, a system and method may include one or more of: 1) the N reports a capability to the PN or to the CU of the IAB donor; 2) the N receives a PCRS configuration including a resource set and a set of power control parameters associated with the resource set; 3) the N receives TPC commands; 4) the N calculates a target transmit power based on the PCRS configuration and TPC commands for an upcoming uplink transmission; and/or 5) if possible, based on channel conditions and node's capability, the N sets power control parameters for uplink communications from child nodes and/or UEs on resources that overlap with the resource set in the PCRS configuration in either or both of time and frequency domains.

It should be noted that information of the uplink transmission power obtained through receiving the PCRS configuration on a resource set T may enable N to produce and transmit a PCRS configuration of its own on the resource set T, which may be sent to child IAB nodes or UEs served by the N. In some embodiments, some or all PCRS configurations may be produced at a CU and communicated to IAB nodes by higher layers.

In various embodiments, a DL-PC request-grant method may be extended to address scenario S4. For this purpose, the N may need to evaluate a range of transmission power suitable for an uplink transmission from a CN and/or a UE and send a request to a PN to make an adjustment to its uplink transmission power from the N on resources that overlap, in either or both time and frequency, with the uplink communication from the CN and/or the UE.

In some embodiments, scenarios S5, S6, S7, and S8 may be similar to scenarios S1, S2, S3, and S4, respectively, except that an IAB node N uses more than one panel for communications with other entities in a spatial area. Using multiple panels may reduce a stringency of power imbalance conditions. Node capability information may be communicated with the rest of a system (e.g., other IAB nodes, IAB donor, and so forth) proactively or upon demand, or the node capability information may be used locally by the IAB node.

As used herein, despite frequent references to IAB, embodiments described herein may be applicable to wireless relay nodes and other types of wireless communication entities.

Moreover, as used herein, although the entities are referred to as IAB nodes, the same methods may be applied to IAB donors, which are the IAB entities connecting the core network to the IAB network, with small or no modifications.

Furthermore, each configuration and/or embodiment described herein may be provided by one or more configurations or embodiments. For example, an earlier configuration may provide a subset of parameters while a later configuration may provide another subset of parameters. As another example, a later configuration may override values provided by an earlier configuration or a pre-configuration.

In certain embodiments, a configuration may be provided by RRC signaling, MAC signaling, a physical layer signaling such as a DCI message, a combination thereof, and/or other means. A configuration may include a pre-configuration or a semi-static configuration provided by a standard, by a vendor, and/or by a network and/or operator. Each parameter value received through a configuration or indication may override previous values for a similar parameter.

Moreover, configurations and signaling described in the embodiments described herein may be introduced to a standard specifications by defining new IEs, new MAC, new L1 signaling, or may be included in already existing IEs and/or signaling. For example, parameters of a PORS or a PCRS may be included in other system configurations such as slot configurations.

Power and energy values in embodiments described herein or in a standard specifications may be described in a real scale (e.g., in mW) or in a logarithmic scale (e.g., dBm). The following are examples of the relationship between values of real and logarithmic scales:

For power, energy, etc.:
$P[dB] = P[dBW] = 10 \log_{10}(P[W])$
$P[dBm] = 10 \log_{10}(P[mW])$
For power offset, power ratio, etc.:
$R[dB] = 10 \log_{10}(R)$ It should be noted that a ratio in a real scale may be equivalent to a difference in a logarithmic scale. Therefore, the words "ratio" and "difference" may be used interchangeably and may be understood from the context.

As used herein, "HARQ-ACK" may represent collectively the Positive Acknowledge ("ACK") and the Negative Acknowledge ("NACK"). ACK may mean that a TB is correctly received while NACK (or NAK) may mean a TB is erroneously received.

Figure 16:
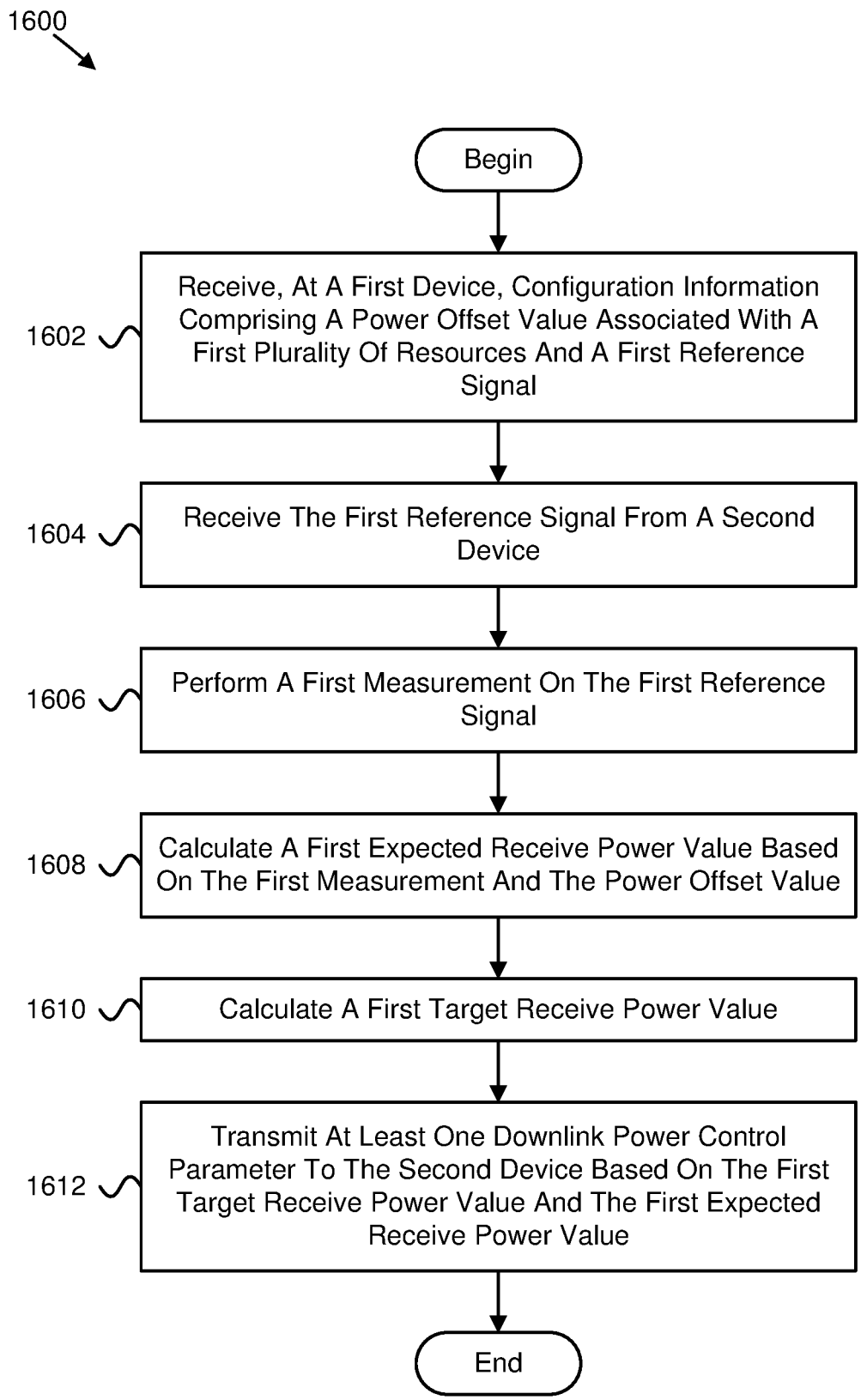
FIG. 16 is a flow chart diagram illustrating one embodiment of a method for power control using at least one power control parameter.

FIG. 16 is a flow chart diagram illustrating one embodiment of a method 1600 for power control using at least one power control parameter. In some embodiments, the method 1600 is performed by an apparatus, such as the remote unit 102 and/or the network unit 104. In certain embodiments, the method 1600 may be performed by a processor executing program code, for example, a microcontroller, a microprocessor, a CPU, a GPU, an auxiliary processing unit, a FPGA, or the like.

In various embodiments, the method 1600 includes receiving 1602, at a first device, configuration information comprising a power offset value associated with a first plurality of resources and a first reference signal. In some embodiments, the method 1600 includes receiving 1604 the first reference signal from a second device. In certain embodiments, the method 1600 includes performing 1606 a first measurement on the first reference signal. In various embodiments, the method 1600 includes calculating 1608 a first expected receive power value based on the first measurement and the power offset value. In some embodiments, the method 1600 includes calculating 1610 a first target receive power value. In certain embodiments, the method 1600 includes transmitting 1612 at least one downlink power control parameter to the second device based on the first target receive power value and the first expected receive power value.

In certain embodiments, the first target receive power value is calculated based on a second expected receive power value associated with the first plurality of resources and a power imbalance threshold. In some embodiments, the power imbalance threshold is predefined, semi-statically configured, dynamically signaled, or some combination thereof. In various embodiments, the second expected receive power value is obtained based on a second measurement on a second reference signal from a third device.

In one embodiment, the first expected receive power value, the first target receive power value, and the second expected power receive value are calculated based on a per-resource-element basis. In certain embodiments, the method 1600 further comprises: receiving, from the second device, an accepted power change value; and transmitting, to a third device, scheduling information for an uplink channel associated with the first plurality of resources based on the accepted power change value, the second expected receive power value, and the power imbalance threshold. In some embodiments, calculating the first target receive power value comprises selecting the first target receive power value such that a ratio between the first target receive power and the second expected receive power is less than the power imbalance threshold.

In various embodiments, the second device provides a first serving cell for the first device, and the second device provides a second serving cell for a third device. In one embodiment, the method 1600 further comprises: receiving, from the second device, an indication of whether the at least one downlink power control parameter is accepted; and transmitting, to a third device, scheduling information for an uplink channel associated with the first plurality of resources based on whether the indication is affirmative. In certain embodiments, being associated with the first plurality of resources comprises: being on a subset of the first plurality of resources; being on a second plurality of resources that overlaps with the first plurality of resources in a time domain; or a combination thereof.

Figure 17:
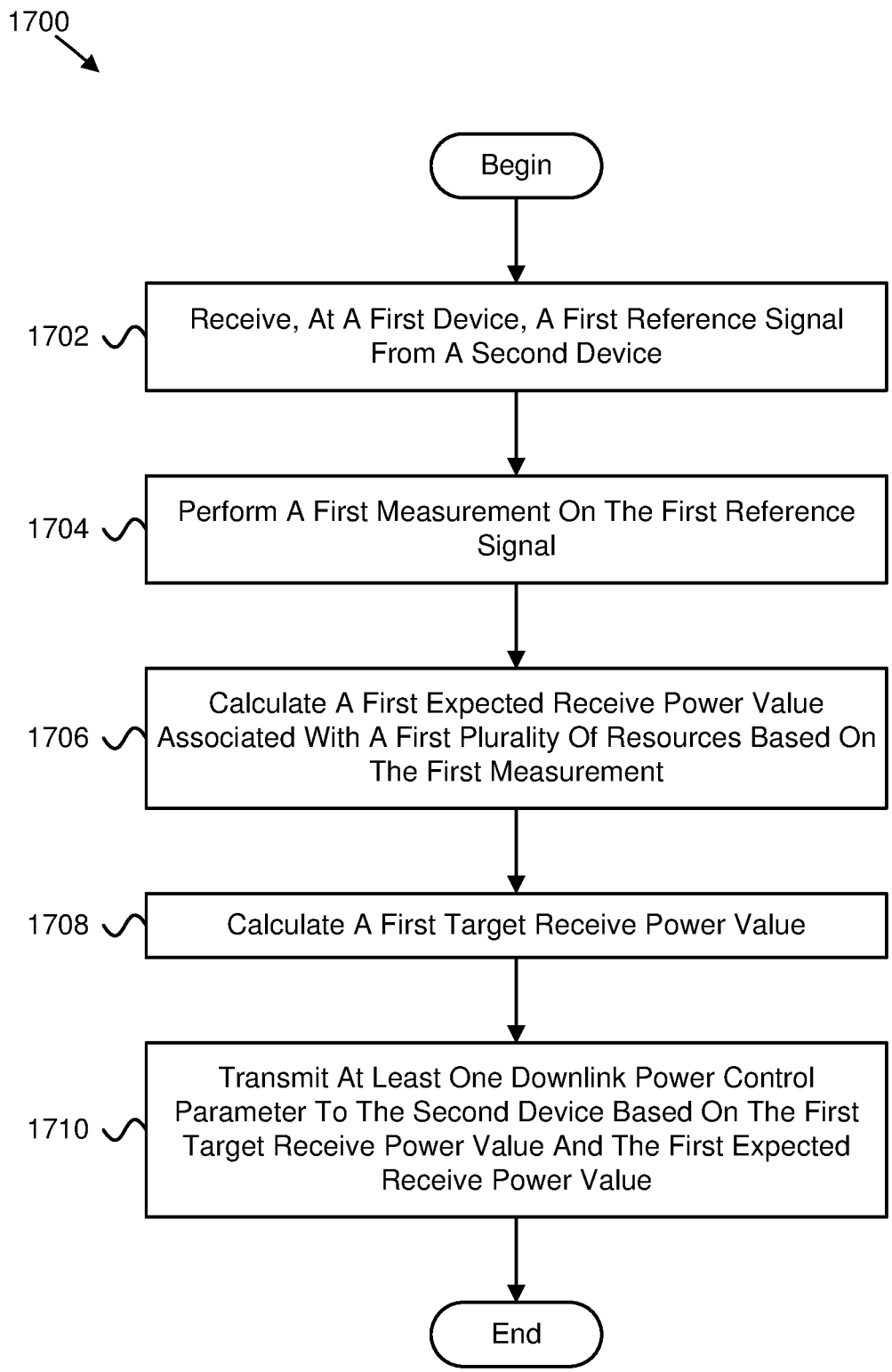
FIG. 17 is a flow chart diagram illustrating another embodiment of a method for power control using at least one power control parameter.

FIG. 17 is a flow chart diagram illustrating another embodiment of a method 1700 for power control using at least one power control parameter. In some embodiments, the method 1700 is performed by an apparatus, such as the remote unit 102 and/or the network unit 104. In certain embodiments, the method 1700 may be performed by a processor executing program code, for example, a microcontroller, a microprocessor, a CPU, a GPU, an auxiliary processing unit, a FPGA, or the like.

In various embodiments, the method 1700 includes receiving 1702, at a first device, a first reference signal from a second device. In some embodiments, the method 1700 includes performing 1704 a first measurement on the first reference signal. In certain embodiments, the method 1700 includes calculating 1706 a first expected receive power value associated with a first plurality of resources based on the first measurement. In various embodiments, the method 1700 includes calculating 1708 a first target receive power value. In some embodiments, the method 1700 includes transmitting 1710 at least one downlink power control parameter to the second device based on the first target receive power value and the first expected receive power value.

In certain embodiments, the first target receive power value is calculated based on a second expected receive power value associated with the first plurality of resources and a power imbalance threshold. In some embodiments, the power imbalance threshold is predefined, semi-statically configured, dynamically signaled, or some combination thereof. In various embodiments, the second expected receive power value is obtained based on a second measurement on a second reference signal from a third device.

In one embodiment, the first expected receive power value, the first target receive power value, and the second expected power receive value are calculated based on a per-resource-element basis. In certain embodiments, the method 1700 further comprises: receiving, from the second device, a granted power change value; and transmitting, to a third device, scheduling information for an uplink channel associated with the first plurality of resources based on the granted power change value, the second expected receive power value, and the power imbalance threshold. In some embodiments, calculating the first target receive power value comprises selecting the first target receive power value such that a ratio between the first target receive power and the second expected receive power is less than the power imbalance threshold.

In various embodiments, the second device provides a first serving cell for the first device, and the second device provides a second serving cell for a third device. In one embodiment, the method 1700 further comprises: receiving, from the second device, an indication of whether the at least one downlink power control parameter is accepted; and transmitting, to a third device, scheduling information for an uplink channel associated with the first plurality of resources based on whether the indication is affirmative. In certain embodiments, being associated with the first plurality of resources comprises: being on a subset of the first plurality of resources; being on a second plurality of resources that overlaps with the first plurality of resources in a time domain; or a combination thereof.

In one embodiment, a method comprises: receiving, at a first device, configuration information comprising a power offset value associated with a first plurality of resources and a first reference signal; receiving the first reference signal from a second device; performing a first measurement on the first reference signal; calculating a first expected receive power value based on the first measurement and the power offset value; calculating a first target receive power value; and transmitting at least one downlink power control parameter to the second device based on the first target receive power value and the first expected receive power value.

In certain embodiments, the first target receive power value is calculated based on a second expected receive power value associated with the first plurality of resources and a power imbalance threshold.

In some embodiments, the power imbalance threshold is predefined, semi-statically configured, dynamically signaled, or some combination thereof.

In various embodiments, the second expected receive power value is obtained based on a second measurement on a second reference signal from a third device.

In one embodiment, the first expected receive power value, the first target receive power value, and the second expected power receive value are calculated based on a per-resource-element basis.

In certain embodiments, the method further comprises: receiving, from the second device, an accepted power change value; and transmitting, to a third device, scheduling information for an uplink channel associated with the first plurality of resources based on the accepted power change value, the second expected receive power value, and the power imbalance threshold.

In some embodiments, calculating the first target receive power value comprises selecting the first target receive power value such that a ratio between the first target receive power and the second expected receive power is less than the power imbalance threshold.

In various embodiments, the second device provides a first serving cell for the first device, and the second device provides a second serving cell for a third device.

In one embodiment, the method further comprises: receiving, from the second device, an indication of whether the at least one downlink power control parameter is accepted; and transmitting, to a third device, scheduling information for an uplink channel associated with the first plurality of resources based on whether the indication is affirmative.

In certain embodiments, being associated with the first plurality of resources comprises: being on a subset of the first plurality of resources; being on a second plurality of resources that overlaps with the first plurality of resources in a time domain; or a combination thereof.

In one embodiment, an apparatus comprises a first device. The apparatus further comprises: a receiver that: receives configuration information comprising a power offset value associated with a first plurality of resources and a first reference signal; and receives the first reference signal from a second device; a processor that: performs a first measurement on the first reference signal; calculates a first expected receive power value based on the first measurement and the power offset value; and calculates a first target receive power value; and a transmitter that transmits at least one downlink power control parameter to the second device based on the first target receive power value and the first expected receive power value.

In certain embodiments, the first target receive power value is calculated based on a second expected receive power value associated with the first plurality of resources and a power imbalance threshold.

In some embodiments, the power imbalance threshold is predefined, semi-statically configured, dynamically signaled, or some combination thereof.

In various embodiments, the second expected receive power value is obtained based on a second measurement on a second reference signal from a third device.

In one embodiment, the first expected receive power value, the first target receive power value, and the second expected power receive value are calculated based on a per-resource-element basis.

In certain embodiments, the receiver receives, from the second device, an accepted power change value; and the transmitter transmits, to a third device, scheduling information for an uplink channel associated with the first plurality of resources based on the accepted power change value, the second expected receive power value, and the power imbalance threshold.

In some embodiments, the processor calculating the first target receive power value comprises the processor selecting the first target receive power value such that a ratio between the first target receive power and the second expected receive power is less than the power imbalance threshold.

In various embodiments, the second device provides a first serving cell for the first device, and the second device provides a second serving cell for a third device.

In one embodiment, the receiver receives, from the second device, an indication of whether the at least one downlink power control parameter is accepted; and the transmitter transmits, to a third device, scheduling information for an uplink channel associated with the first plurality of resources based on whether the indication is affirmative.

In certain embodiments, being associated with the first plurality of resources comprises: being on a subset of the first plurality of resources; being on a second plurality of resources that overlaps with the first plurality of resources in a time domain; or a combination thereof.

In one embodiment, a method comprises: receiving, at a first device, a first reference signal from a second device; performing a first measurement on the first reference signal;

calculating a first expected receive power value associated with a first plurality of resources based on the first measurement; calculating a first target receive power value; and transmitting at least one downlink power control parameter to the second device based on the first target receive power value and the first expected receive power value.

In certain embodiments, the first target receive power value is calculated based on a second expected receive power value associated with the first plurality of resources and a power imbalance threshold.

In some embodiments, the power imbalance threshold is predefined, semi-statically configured, dynamically signaled, or some combination thereof.

In various embodiments, the second expected receive power value is obtained based on a second measurement on a second reference signal from a third device.

In one embodiment, the first expected receive power value, the first target receive power value, and the second expected power receive value are calculated based on a per-resource-element basis.

In certain embodiments, the method further comprises: receiving, from the second device, a granted power change value; and transmitting, to a third device, scheduling information for an uplink channel associated with the first plurality of resources based on the granted power change value, the second expected receive power value, and the power imbalance threshold.

In some embodiments, calculating the first target receive power value comprises selecting the first target receive power value such that a ratio between the first target receive power and the second expected receive power is less than the power imbalance threshold.

In various embodiments, the second device provides a first serving cell for the first device, and the second device provides a second serving cell for a third device.

In one embodiment, the method further comprises: receiving, from the second device, an indication of whether the at least one downlink power control parameter is accepted; and transmitting, to a third device, scheduling information for an uplink channel associated with the first plurality of resources based on whether the indication is affirmative.

In certain embodiments, being associated with the first plurality of resources comprises: being on a subset of the first plurality of resources; being on a second plurality of resources that overlaps with the first plurality of resources in a time domain; or a combination thereof.

In one embodiment, an apparatus comprises a first device. The apparatus further comprises: a receiver that receives a first reference signal from a second device; a processor that: performs a first measurement on the first reference signal; calculates a first expected receive power value associated with a first plurality of resources based on the first measurement; and calculates a first target receive power value; and a transmitter that transmits at least one downlink power control parameter to the second device based on the first target receive power value and the first expected receive power value.

In certain embodiments, the first target receive power value is calculated based on a second expected receive power value associated with the first plurality of resources and a power imbalance threshold.

In some embodiments, the power imbalance threshold is predefined, semi-statically configured, dynamically signaled, or some combination thereof.

In various embodiments, the second expected receive power value is obtained based on a second measurement on a second reference signal from a third device.

In one embodiment, the first expected receive power value, the first target receive power value, and the second expected power receive value are calculated based on a per-resource-element basis.

In certain embodiments, the receiver receives, from the second device, a granted power change value; and the transmitter transmits, to a third device, scheduling information for an uplink channel associated with the first plurality of resources based on the granted power change value, the second expected receive power value, and the power imbalance threshold.

In some embodiments, the processor calculating the first target receive power value comprises the processor selecting the first target receive power value such that a ratio between the first target receive power and the second expected receive power is less than the power imbalance threshold.

In various embodiments, the second device provides a first serving cell for the first device, and the second device provides a second serving cell for a third device.

In one embodiment, the receiver receives, from the second device, an indication of whether the at least one downlink power control parameter is accepted; and the transmitter transmits, to a third device, scheduling information for an uplink channel associated with the first plurality of resources based on whether the indication is affirmative.

In certain embodiments, being associated with the first plurality of resources comprises: being on a subset of the first plurality of resources; being on a second plurality of resources that overlaps with the first plurality of resources in a time domain; or a combination thereof.

Embodiments may be practiced in other specific forms. The described embodiments are to be considered in all respects only as illustrative and not restrictive. Moreover, any of the embodiments described herein may be combined together. The scope of the invention is, therefore, indicated by the appended claims rather than by the foregoing description. All changes which come within the meaning and range of equivalency of the claims are to be embraced to within their scope.

The invention claimed is:

1. An apparatus for performing a network function, the apparatus comprising:
at least one memory; and
at least one processor coupled with the at least one memory and configured to cause the apparatus to:
receive, at a first node, a resource configuration indicating:
an identifier (ID) of the resource configuration;
a plurality of slots; and
a periodicity; and
receive, from a second node, a first control message indicating a received power of a physical downlink shared channel (PDSCH) on resources in a time domain, a frequency domain, and a spatial domain, wherein the resources in the time domain are indicated by the resource configuration and the first control message comprises:
the identifier of the resource configuration;
a first indication of a downlink transmission power adjustment value; and
a second indication of first beam indices; and
obtain the received power of the PDSCH associated with the resources and first beam indices and based on a power offset value with respect to a channel state information reference signal (CSI-RS) received power.

2. The apparatus of claim 1, wherein the first node is an integrated access and backhaul (IAB) node, and the second node is a parent node of the first node.

3. The apparatus of claim 1, wherein the first control message is a first medium access control (MAC) message.

4. The apparatus of claim 1, wherein the resource configuration is indicated in a radio resource control (RRC) information element (IE).

5. The apparatus of claim 1, wherein the power adjustment value is in decibels (dB).

6. The apparatus of claim 1, wherein of the first beam indices comprise one or more of synchronization signal and block (SSB) indices, CSI-RS indices, or quasi-collocation (QCL) parameters.

7. The apparatus of claim 1, wherein the first node is an IAB node and one or more of the second node is a parent node of the first node or the first node is a child node of the second node.

8. The apparatus of claim 1, wherein the at least one processor is configured to cause the apparatus to:
   send, to the second node, a second MAC message indicating one or more of:
      the identifier of the resource configuration;
      a fourth indication of a desired downlink transmission power adjustment value;
      a fifth indication of second beam indices; or
      a sixth indication of second frequency resources.

9. The apparatus of claim 8, wherein the second control message is a second medium access control (MAC) message.

10. The apparatus of claim 8, wherein the desired power adjustment value is in decibels (dB).

11. The apparatus of claim 8, wherein of the second beam indices comprise one or more of synchronization signal and block (SSB) indices, CSI-RS indices, or quasi-collocation (QCL) parameters.

12. A method of performing a network function, the method comprising:
   receiving, at a first node, a resource configuration indicating:
      an identifier (ID) of the resource configuration;
      a plurality of slots; and
      a periodicity;
   receiving, from a second node, a first control message indicating a received power of a physical downlink shared channel (PDSCH) on resources in a time domain, a frequency domain, and a spatial domain, wherein the resources in the time domain are indicated by the resource configuration and the first control message comprises:
      the identifier of the resource configuration;
      a first indication of a downlink transmission power adjustment value; and
      a second indication of first beam indices; and
   obtaining the received power of the PDSCH associated with the resources and first beam indices and based on a power offset value with respect to a channel state information reference signal (CSI-RS) received power.

13. The method of claim 12, wherein the first node is an integrated access and backhaul (IAB) node, and the second node is a parent node of the first node.

14. The method of claim 12, wherein the first control message is a first medium access control (MAC) message.

15. The method of claim 12, wherein the resource configuration is indicated in a radio resource control (RRC) information element (IE).

16. The method of claim 12, wherein the power adjustment value is in decibels (dB).

17. The method of claim 12, wherein of the first beam indices comprise one or more of synchronization signal and block (SSB) indices, CSI-RS indices, or quasi-collocation (QCL) parameters.

18. An apparatus for performing a network function, the apparatus comprising:
   at least one memory; and
   at least one processor coupled with the at least one memory and configured to cause the apparatus to:
      receive, at an integrated access and backhaul (IAB) node, from a radio resource control (RRC) information element (IE), a resource configuration indicating:
         an identifier (ID) of the resource configuration;
         a plurality of slots; and
         a periodicity;
      receive, from a parent node of the IAB node, a first medium access control (MAC) message indicating a received power of a physical downlink shared channel (PDSCH) on resources in a time domain, a frequency domain, and a spatial domain, wherein the resources in the time domain are indicated by the resource configuration and the MAC message comprises:
         the identifier of the resource configuration;
         a first indication of a downlink transmission power adjustment value; and
         a second indication of first beam indices comprising one or more of first synchronization signal block (SSB) indices, first channel state information reference signal (CSI-RS) indices, or first quasi-collocation (QCL) parameters;
      a processor to obtain the received power of the PDSCH associated with the resources and first beam indices and based on a power offset value with respect to a CSI-RS received power; and
      send, to the parent node, a second MAC message indicating one or more of:
         the identifier of the resource configuration;
         a fourth indication of a desired downlink transmission power adjustment value;
         a fifth indication of second beam indices comprising second SSB indices, second CSI-RS indices, second QCL parameters, or some combination thereof, or
         a sixth indication of second frequency resources;
         or some combination thereof.

19. The apparatus of claim 18, wherein the resource configuration is indicated in a radio resource control (RRC) information element (IE).

20. The apparatus of claim 18, wherein the MAC message comprises a third indication of first frequency resources.

* * * * *